United States Patent
Isonuma et al.

(10) Patent No.: US 7,042,836 B2
(45) Date of Patent: May 9, 2006

(54) TRANSMITTING APPARATUS

(75) Inventors: Ritsuko Isonuma, Kawasaki (JP); Hideaki Mochizuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1084 days.

(21) Appl. No.: 09/753,903

(22) Filed: Jan. 3, 2001

(65) Prior Publication Data

US 2001/0046207 A1 Nov. 29, 2001

(30) Foreign Application Priority Data

May 29, 2000 (JP) .................................... 2000-158295

(51) Int. Cl.
*H04L 1/00* (2006.01)

(52) U.S. Cl. .................. 370/224; 370/222; 370/223; 370/224

(58) Field of Classification Search .............. 370/216, 370/221, 222, 223, 224, 227, 228, 219, 218, 370/539, 241, 242, 249, 254, 258, 541; 714/1, 714/2, 3, 4

See application file for complete search history.

(56) References Cited

U.S. PATENT DOCUMENTS

| | | | | |
|---|---|---|---|---|
| 5,442,620 A | * | 8/1995 | Kremer | 370/224 |
| 5,537,393 A | * | 7/1996 | Shioda et al. | 370/223 |
| 5,757,768 A | * | 5/1998 | Goto et al. | 370/222 |
| 6,317,426 B1 | * | 11/2001 | Afanador et al. | 370/352 |
| 6,452,931 B1 | * | 9/2002 | Norman, Jr. | 370/405 |
| 6,456,587 B1 | * | 9/2002 | Taniguchi | 370/216 |

FOREIGN PATENT DOCUMENTS

JP 10243008 9/1998

* cited by examiner

*Primary Examiner*—Ajit Patel
*Assistant Examiner*—Andrew C. Lee
(74) *Attorney, Agent, or Firm*—Katten Muchin Zavis Rosenman

(57) ABSTRACT

A transmitting apparatus for cross connecting and transmitting main signals which enter via ring-configured transmission lines to which working and protection channels have been assigned in first and second directions, and rescuing a main signal by looping back the main signal in the opposite direction using the protection channel when a transmission line fails. Storing non-rescue information which indicates whether each channel that is the object of rescue by loopback is a non-rescue channel. Determining whether a failure for which rescue is impossible has occurred in each channel, which is the object of rescue, other than a non-rescue channel. On the basis of main-signal cross-connect information, interchanging a result of discrimination of each channel and inserting the interchanged result of discrimination in the main signal of the corresponding channel after cross connect.

10 Claims, 26 Drawing Sheets

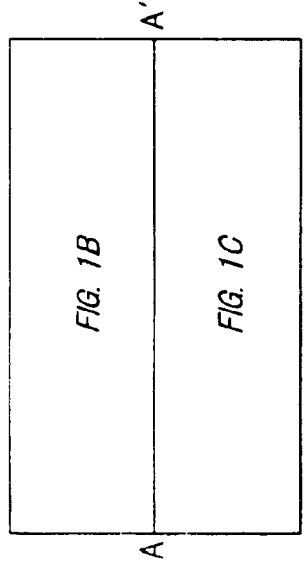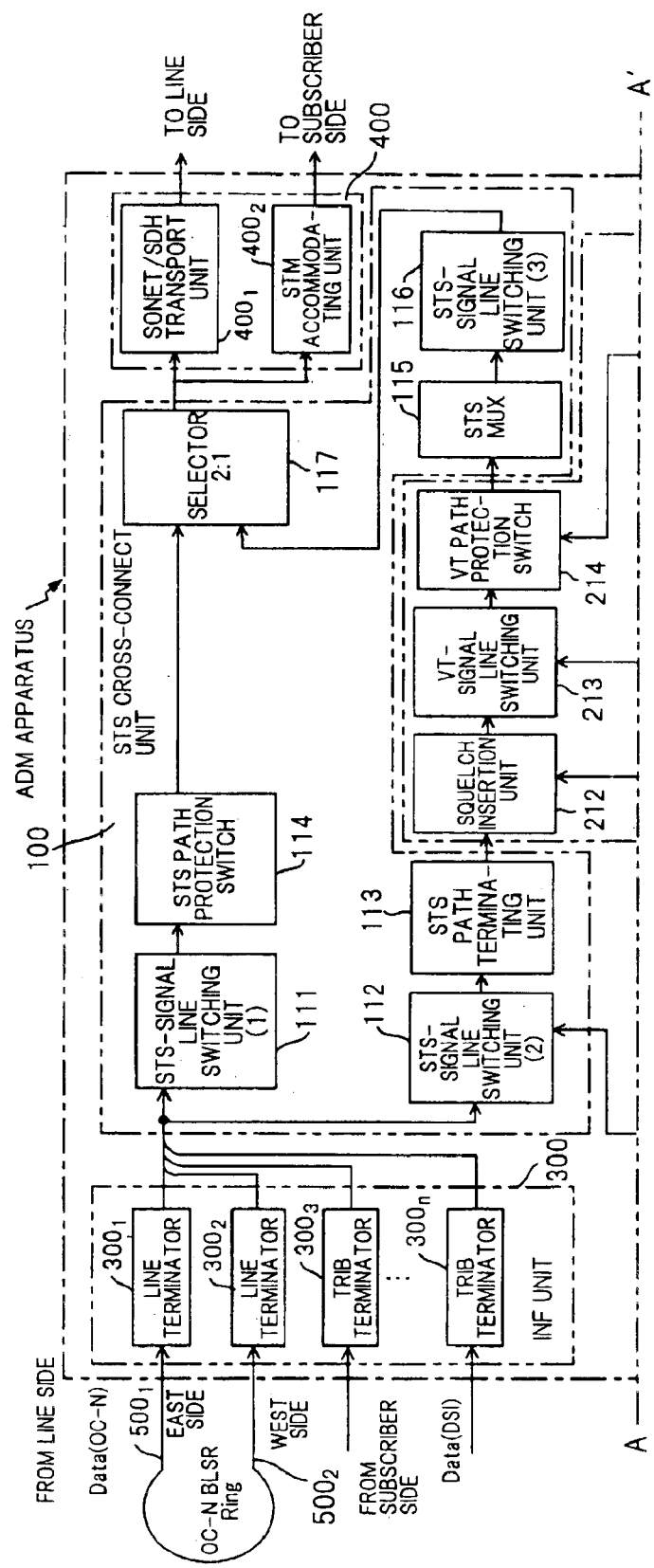

<CONFIGURATION FOR
OC-12 BLSR APPLICATION>

<CONFIGURATION FOR
OC-48 BLSR APPLICATION>

FIG. 5

OC-12 BLSR #1

| D15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| * | * | * | * | * | * | * | * | * | * | ch6 | ch5 | ch4 | ch3 | ch2 | ch1 |

OC-12 BLSR #2

| D15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| * | * | * | * | * | * | * | * | * | * | ch6 | ch5 | ch4 | ch3 | ch2 | ch1 |

OC-48 BLSR

| D15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| * | * | * | * | ch12 | ch11 | ch10 | ch9 | ch8 | ch7 | ch6 | ch5 | ch4 | ch3 | ch2 | ch1 |

OC-48 BLSR

| D15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| * | * | * | * | ch24 | ch23 | ch22 | ch21 | ch20 | ch19 | ch18 | ch17 | ch16 | ch15 | ch14 | ch13 |

"1"=NUT channel
"0"=not NUT channel

FIG. 6

| BLSR Type | | |
|---|---|---|
| OC12-2 | OC12-1 | OC-48 |

OC-48: OC-48 BLSR DESIGNATION; "1" : WHEN OC-48 BLSR; "0" : NOT OC-48 BLSR
OC-12-1: OC-12 BLSR #1 DESIGNATION; "1" : WHEN OC-12 BLSR #1; "0" : NOT OC-12 BLSR #1
OC-12-2: OC-12 BLSR #2 DESIGNATION; "1": WHEN OC-12 BLSR #2; "0" : NOT OC-12 BLSR #2

FIG. 7A

| APPLICATION | NUMBER OF NUT CHANNEL SETTING REGISTERS ACCORDING TO PRIOR ART (N) | NUMBER OF NUT CHANNEL SETTING REGISTERS ACCORDING TO PRESENT INVENTION (M) |
|---|---|---|
| not BLSR | 192 | 0 |
| OC-12 BLSR | | 6 |
| OC-48 BLSR | | 24 |

(WHEN MAXIMUM VT ACCESS PROCESSING CAPACITY OF APPARATUS IS 10 Gbps)

FIG. 7B

| APPLICATION | NUMBER OF BLSR-TYPE SETTING REGISTERS ACCORDING TO PRIOR ART (N) | NUMBER OF BLSR-TYPE SETTING REGISTERS ACCORDING TO PRIOR ART (L) |
|---|---|---|
| WHEN OC-12 BLSR, OC-48 BLSR OR ITEM OTHER THAN BLSR CAN BE SELECTED | 192 | 2 |

(WHEN MAXIMUM VT ACCESS PROCESSING CAPACITY OF APPARATUS IS 10 Gbps)

FIG. 7C

| APPLICATION | NUMBER OF SQL ACTIVATE PROCESSING CHANNELS ACCORDING TO PRIOR ART (N×VT*) | NUMBER OF SQL ACTIVATE PROCESSING CHANNELS ACCORDING TO PRESENT INVENTION (M×VT*) |
|---|---|---|
| not BLSR | 5376 | 0 |
| OC-12 BLSR | | 168 (=6×28) |
| OC-48 BLSR | | 672 (=24×28) |

(WHEN MAXIMUM VT ACCESS PROCESSING CAPACITY OF APPARATUS IS 10 Gbps)

Node B VT Squelch Table

| East Side | West Side |
|---|---|
| 2 | 0 |

FIG. 26 PRIOR ART
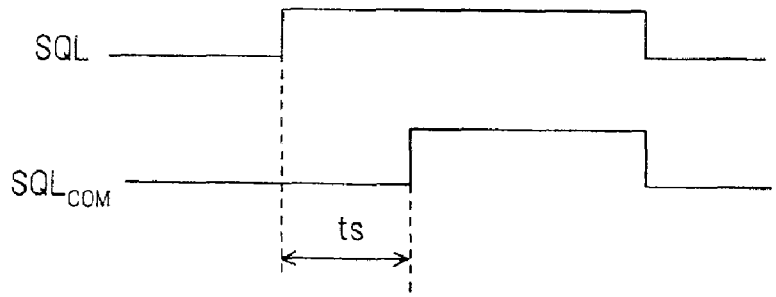
FIG. 27 PRIOR ART
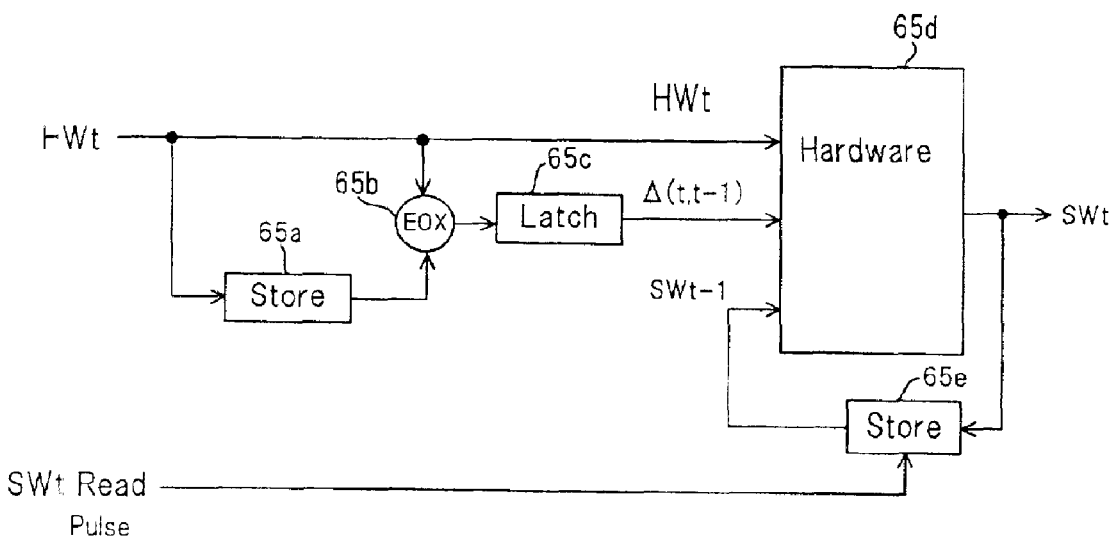
FIG. 28 PRIOR ART
| SWt-1 | Δ(t,t-1) | HWt | SWt |
|---|---|---|---|
| 0 | 0 | 0 | 0 |
| 0 | 0 | 1 | 1 |
| 0 | 1 | 0 | 1 |
| 0 | 1 | 1 | 1 |
| 1 | 0 | 0 | 0 |
| 1 | 0 | 1 | 1 |
| 1 | 1 | 0 | 0 |
| 1 | 1 | 1 | 0 |

TRANSMITTING APPARATUS

BACKGROUND OF THE INVENTION

This invention relates to a transmitting apparatus which constructs a ring network that is capable of transmitting in first and second directions. More particularly, the invention relates to a transmitting apparatus for cross connecting and transmitting signals on respective channels which enter via transmission paths to which working and protection channels have been assigned in each of the transmission directions, and rescuing a signal by looping back the signal in the opposite direction using the protection channel when a transmission path fails.

Synchronous optical networks (SONET), which utilize optical communication that is capable of high-capacity transmission, have become widespread owing to an increase in communication traffic. With SONET, user data undergoes multiplexed transmission in accordance with a Synchronous Transport Signal (STS-N) frame (where N represents an integer) format. FIG. 12 is a diagram showing the structure of a 51.84 Mbps STS-1 frame. The frame has 9×90 bytes overall (810 bytes/125 μs), of which 3×9 bytes constitute overhead OH and 87×9 bytes constitute an STS payload STS-1 SPE (Synchronous Payload Envelope). Nine bytes of the payload constitute path overhead PON, and VT (Virtual Tributary) packets of V multiple channels are multiplexed onto the remaining 86×9 bytes. With SONET, frame formats other than the STS-1 frame format mentioned above include STS-3 (155.52 Mbps), STS-12 (622.08 Mbps) and STS-48 (2.488 Gbps). These frame formats can be used in appropriate fashion by optical transmission lines.

(a) VT Structure

VT packets are of four types, namely VT 1.5, VT 2, VT 3 and VT 6, as shown (a) through (d) of FIG. 13. A VT 1.5 packet is composed of 27 (=3×9) bytes, and the bit rate of ore VT channel is 1.728 Mbps (=27×8/125 Mbps). A VT 2 packet is composed of 36 (=4×9) bytes, and the bit rate of one VT channel is 2.30 Mbps (=36×8/125 Mbps). A VT 3 packet is composed of 54 (=6×9) bytes, and the bit rate of one VT channel is 3.456 Mbps (=54×8/125 Mbps). A VT 6 packet is composed of 108 (=12×9) bytes, and the bit rate of one VT channel is 6.912 Mbps (=108×8/125 Mbps).

(b) Mapping of VT 1.5 Packets into STS-1 SPE

FIG. 14 is a diagram useful in describing the mapping of VT 1.5 packets into a VT-structured STS-1 SPE (Synchronous Payload Envelope). A first column is for path overhead POH, and $30^{th}$ and $59^{th}$ columns are for fixed stuff composed of all "1"s. The $30^{th}$ and $59^{th}$ columns divide the STS-1 SPE into three areas of 28 columns each. The $1^{st}$ to $28^{th}$ columns of each area are assigned 1-1, 2-1, 3-1, 4-1, 5-1, 6-1, 7-1, 1-2, 2-2, ... , 7-4 sequentially. VT 1.5 packets of the first channel are placed in the $2^{nd}$, $31^{st}$ and $60^{th}$ rows, VT 1.5 packets of the second channel are placed in the $3^{rd}$, $32^{nd}$ and $61^{th}$ rows, and VT 1.5 packets of the $28^{th}$ channel are placed in the $29^{th}$, $58^{th}$ and $87^{th}$ rows.

A VT superframe (multiframe) having a 500-μs structure is defined by four VT-structured STS-1 SPE frames. As shown in FIG. 15, V1, V2 bytes (VT payload pointers), a V3 byte (pointer action byte) and a V4 byte (undefined byte) are arrayed at the leading positions ($2^{nd}$ to $29^{th}$ columns of the first row) of each STS-1 SPE that constructs this VT superframe; the remainder constitutes a VT SPE.

FIG. 16A is a diagram showing the overall structure of a VT superframe. The VT superframe is composed of the V1 to V4 bytes and 26 bytes per channel. As shown in FIG. 16B, the VT SPE is composed of 4-byte VT path overhead VT POE (V5, J2, Z6 and Z7) and a VT payload of 28×4 VT ch (25 bytes per channel). The V5 byte in the VT path overhead is the leading byte of the VT SPE and the position thereof is specified by the VT payload pointers V1, V2. It should be noted that the V5 byte indicates error checking, signal label and path status. It includes the parity result of BIP-2 (Bit Interleaved Parity-2).

(c) Ring Structure

A ring structure in which a transmitting apparatus is connected in the form of a ring from the viewpoint of assuring reliability is known as a network configuration for SONET. The ring structure is such that if a failure occurs in a transmission path, the transmission can be continued via an alternative transmission path, thereby making it possible to improve the reliability of transmission. FIG. 17 is a block diagram illustrating the structure of an ADM (Add/Drop Mux) transmitting apparatus that can be ring-connected. FIG. 18 is a diagram useful in describing the ring structure.

The ADM transmitting apparatus is terminal equipment having a MUX (multiplexing) function and an add/drop function. More specifically, the apparatus has (1) an STS-level cross-connect function, (2) a VT-level cross-connect function and (3) an add/drop function for the tributary side. By way of example, line interfaces (LIF) 1a, 1b receive higher order signals (e.g., OC-12 optical signals) from optical transmission lines on EAST and WEST sides, respectively, convert these signals to electrical signals and execute processing based upon overhead information. Demultiplexers (DMUX) 2a, 2b demultiplex higher order signals into lower order signals (e.g., STS-1 electrical signals), an STS/VT cross-connect unit 3 performs switching on the STS level, multiplexers (MUX) 4a, 4b multiplex the switched STS-1 signals into higher order signals and line interfaces (LIF) 5a, 5b add overhead onto these higher order signals, convert the signals to optical signals and send the optical signals to the optical transmission lines on the EAST and WEST sides, respectively.

The STS/VT cross-connect unit 3 switches, on the STS level, STS-1 signals inserted from tributary interfaces 6a, 6b, . . . via MUX/DMUXs 7a, 7b, . . . and sends these switched signals in the EAST or WEST direction. The STS/VT cross-connect unit 3 also drops signals, which have been received from the transmission line on the EAST or WEST side, on the tributary side, demultiplexes these signals to VT signals of a prescribed speed via the MUX/DMUXs 7a, 7b, . . . and sends the signals to the tributary side from the tributary interfaces 6a, 6b, . . . . The STS/VT cross-connect unit 3 further incorporates a VT-level cross-connect switch for separating a prescribed STS-1 signal into VT channels, performing switching at the VT-level, multiplexing the switched VT signals into an STS signal, subjecting the STS signal to STS-level cross-connect processing and sending the resultant signal to the prescribed transmission path. The transmission paths on the EAST and WEST sides both have working and protection channels assigned to them. The transmitting apparatus normally transmits signals using the working channel.

(d) Protection at Time of Transmission-path Failure

In accordance with the ring architecture, ADM transmitters 10a–10d of the kind depicted in FIG. 17 are connected in the form of a ring in the manner shown in FIG. 18. If a certain transmission path develops a failure or suffers a decline in quality, signals are transmitted in a direction that avoids this transmission path, thereby allowing communication to continue and assuring reliability and quality.

FIG. 19 is a diagram useful in describing a UPSR (Unidirectional Path Switched Ring), which is one transmission line switching system available for SONET ring networks. A transmit node A on a synchronous multiplexed transmission line constructing the ring sends a signal in two directions, and a receive node C selects either of these signals to effect path switch or switch-back. In (a) of FIG. 19, the node A sends an input signal in two directions, namely (1) a direction that leads to node C via a node D and (2) a direction that leads to node C via a node B. The route that is usually selected is referred to as a "default path". If a failure develops in the transmission path from node A to node D, as shown in (b) of FIG. 19, during communication via the default path, as a result of which communication can no longer take place, node C selects the signal that arrives via node B, thereby allowing communication to continue. Such a path not selected normally but only in the event of a failure in the default path is referred to as a "non-default path". The functional element that performs such path switching is referred to as a "path protection switch".

FIG. 20 is a diagram useful in describing rescue by a BLSR (Bidirectional Line Switched Ring) in a SONET ring network. Here communication is normally performed using a working channel and communication is rescued using a protection channel when a transmission path develops a failure. In case of OC-12, for example, a transmission path has 12 channels on the STS-1 level in the EAST and WEST directions, the first to sixth of these channels are working channels and the seventh to $12^{th}$ channels are protection channels. In (a) of FIG. 20, node A sends a signal, which has entered from the tributary side, to node C on the EAST side via node D using the working channel. If the transmission path between nodes A and D fails during this communication, node A can no longer communicate with the EAST side via node D. Accordingly, as shown in (b) of FIG. 20, the signal is sent to the WEST side over the following route: node A‡node B‡node C‡node D (the route indicated by the dashed line), and node D effects loop-back to send the signal to node C using the working channel. Further, in (c) of FIG. 20, node B sends a signal from the EAST side to node D via node A using the working channel. If the transmission path between nodes A and D fails during this communication, node A loops back the signal, which arrives from node B, to the WEST side using the protection channel, and the signal is sent to node D via nodes B and C.

(e) Transmitting Apparatus Having ADM Function

FIG. 21 illustrates a more detailed example of the structure of a transmitting apparatus equipped with the ADM function. Here the cross-connect section for performing SST cross-connect and VT cross-connect is illustrated in detail. A transmitting apparatus 10 is constituted by an STS cross-connect unit 10A, a VT cross-connect unit 20A, INF units $30_1$–$30_n$ on the input side and INF units $40_1$–$40_n$ on the output side.

The STS cross-connect unit 10A cross connects STS signals, the VT cross-connect unit 20A cross connects VT signals, the line INF units $30_1$–$30_n$ on the input side convert optical signals, which enter from optical transmission paths on the EAST/WEST sides, to electrical signals and perform STS termination processing, tributary INF units $30_3$–$30_n$ send lower order signals, which enter from the tributary side, upon multiplexing the signals into an STS signal, line INF units $40_{1\ -4 02}$ on the output side convert STS signals, which are output from the STS cross-connect unit 10A, to optical signals and send these signals to optical transmission paths on the EAST/WEST sides upon attaching overhead, and tributary INF units $40_3$–$40_n$ separate the STS signals into lower order signals and send these signals to the tributary side.

The STS cross-connect unit 10A has (1) STS-signal line switching units (STS TSI units) 11, 12 for performing cross-connect at the STS level; (2) an STS termination unit 14 for performing STS termination processing and separating an STS signal into VT signals; (3) an STS path protection SW unit (STS PSW unit) 15 for performing path protection by UPSR; (4) an STS-signal line switching unit (STS TSI unit) 13 for cross connecting, at the STS level, an STS signal obtained by multiplexing VT signals cross-connected at the VT level; and (5) a selector (SEL unit) 16 for selecting one of the STS signals cross-connected by the STS TSI unit 11 and STS TSI unit 13.

The VT cross-connect unit 20A has (1) a VT SQL unit 21 for executing squelch processing for each VT channel; (2) a VT-signal line switching unit (VT TSI unit 22) for performing cross-connect at the VT level; and (3) a VT path protection SW unit (VT PSW unit) 23 for performing path protection switching. When a failure for which rescue by BLSR is impossible occurs in a certain VT channel, squelch processing inserts an AIS (Alarm Indication Signal) (the result of squelch discrimination) into the VT channel.

Signals that have entered from the INF units $30_1$–$30_n$ are branched in two direction at a branch point 24 so as to enter the STA TSI units 11, 12. Among the STS signals that enter from the INF units $30_1$–$30_n$, the STS TSI unit 11 cross connects, at the STS level, STS signals that do not require cross-connect at the VT level and inputs these signals to the SEL unit 16 via the STS PSW unit 15. The SEL unit 16 selects the prescribed signals and inputs the selected signals to the INF units $40_1$–$40_n$. Among the STS signals that enter from the INF units $30_1$–$30_n$, the STS TSI unit 12 cross connects, at the STS level, only STS signals that require cross-connect at the VT level. The STS termination unit 14 then subjects the cross-connected STS signals to STS termination processing and inputs the obtained signal (VT signal) of each channel to the VT cross-connect unit 20A. The VT SQL unit 21 in the VT cross-connect unit 20A executes VT squelch processing and the VT TSI unit 22 performs cross-connect at the VT level and inputs the signals to a multiplexer (STS MUX), not shown, via the VT PSW unit 23. The multiplexer multiplexes the VT signals into an STS signal and inputs this signal to the STS TSI unit 13. The latter cross connects the entered STS signal at the STS level and inputs the signal to the SEL unit 16. The latter selects the prescribed STS signal and inputs this signal to the INF units $40_1$–$40_n$. The VT SQL unit 21 executes squelch processing. When a failure for which rescue by BLSR is impossible occurs, the VT SQL unit 21 executes squelch processing to insert the AIS (Alarm Indication Signal) on a per-VT-channel basis.

(f) Squelch

FIGS. 22A and 22B are diagrams useful in describing VT squelch and illustrates a BLSR configuration in EAST (clockwise in FIG. 22A and WEST (counter-clockwise in FIG. 22A directions. The BLSR has a working channel and a protection channel in the EAST and WEST directions. FIG. 22A illustrates a case where a signal (VT signal) on a prescribed VT channel enters from a node A, passes through a node D and exits from a node B. The node ID of node B, which is the node of interest, is made 0, while the other nodes are assigned node IDs 1, 2 and 3 in ascending order in the WEST direction starting from 0. Each node has a squelch table (FIG. 22B) used when determining whether to perform VT squelch (i.e., whether to insert the AIS signal). Connection-destination node IDs for the EAST and WEST directions are recorded in the table. Specifically, the source node of a VT signal that has been physically connected to the EAST side of the node of interest is set in an East Side column of the table, and the source node of a VT signal that has been physically connected to the WEST side of the node of interest is set in a West Side column of the table. In the example of FIG. 22A, the source node of the VT channel input and dropped on the EAST side of the node B of interest is node A (ID=2). Accordingly, the node ID "2" is set in the East Side column of the squelch table of the above-mentioned VT channel. Since there is no input from the WEST side, "0" is set in the West Side column. If multiple failures occur at points E, F, node B can no longer detect the VT signal of node ID 2 as a far-end node on the VT channel. As a result, it is judged that an unrescuable failure has occurred and squelch is applied to this VT channel. That is, a Path-AIS (P-AIS) is inserted into the VT signal of this VT channel.

FIG. 23 is a diagram illustrating an arrangement based upon the prior art of the VT SQL unit 21 in FIG. 21. A squelch-table setting unit 50 has registers (VT1–VT28) for 28 VT channels for each of STS channels STS ch1 to STS chN ($50_1$–$50_N$). A controller (μ-COM) 57 sets data (a squelch table) in each register. SQL discrimination units $52_1$–$52_N$ each have discriminators for 28 VT channels for each of the STS channels, compare a far-end node ID with node IDs that have been set in the squelch tables for each of 28×N VT channels, and determine whether VT squelch is to be applied or not. Latches $54_1$–$54_N$ hold the results of discrimination for each of the 28×N VT channels, and a squelch insertion unit 56 for inserting the P-AIS into the particular VT channel. Since the far-end node ID (the ID of the farthest node capable of data transmission among the nodes connected) is ascertained from the overhead for every transmission path in the EAST and WEST direction, the SQL discrimination units $52_1$–$52_N$ compare the far-end node ID with the node IDs that have been set in the squelch tables of the VT channels and (1) judge that an unrescuable failure has not occurred if the far-end node ID is equal to or greater than the node ID and (2) judge that an unrescuable failure has occurred, and insert the P-AIS into the particular NT channel, if the far-end node ID is smaller than the node ID. For instance, if failures occur at points E, F in the example of FIG. 22A, the far-end node ID on the EAST side of node B is the ID "1" of node D. Since the set node ID (=2) is greater than the far-end node ID (=1), squelch is applied to the pertinent VT channel.

(g) BLSR Information and NUT Information

Squelch inserts the P-AIS into a VT channel that cannot be rescued by BLSR (Bidirectional Line Switched Ring) loop-back. This means that it is unnecessary to apply squelch processing to a VT channel that is not the object of BLSR rescue. In other words, squelch processing need be applied only to a VT channel that has been mapped to an STS channel which is input via a BLSR; it is unnecessary to apply squelch processing to a VT channel that has been mapped to an STS channel which is input from the tributary side. In the prior art, therefore, information (BLSR information) indicating whether a channel is the object of BLSR rescue is set for all N-number of STS channels after STS cross-connect by the STS TSI unit 12 (see FIG. 21), and squelch processing is executed only for VT channels that are the object of BLSR rescue.

Even if an STS channel is the object of BLSR rescue, this STS channel may be one that does not use the BLSR Automatic Protection Switch technique. For example, there are instances where rescue by another rescue method such as UPSR is desired or instances where a protection channel is used as the equivalent of a working channel and BLSR rescue is not carried out even if a failure occurs. It is unnecessary to apply squelch processing to a VT channel that has been mapped to such an STS channel (traffic). Such traffic is referred to NUT (Non-preemptive Unprotected Traffic). In accordance with the prior art, therefore, NUT information indicating whether or not a channel is a NUT channel is set in regard to all N-number of STS channels after STS cross-connect by the STS TSI unit 12 (see FIG. 21), and squelch processing is applied only to a VT channel of an STS channel (traffic) that is the object of BLSR rescue and that has not been set as a NUT channel. In other words, even if a channel is one that is the object of BLSR rescue, squelch processing is not executed if the channel is a NUT channel.

FIG. 24 is a diagram illustrating the overall structure of a squelch processor having a BLSR information setting unit 61 and a NUT information setting unit 62. Components identical with those shown in FIG. 23 are designated by like reference characters. PS converters $53_1$–$53_N$ serially convert and output the results of squelch discrimination of 28 VT channels stored in respective ones of latches $54_1$–$54_N$, and a multiplexer 55 multiplexes N×28 results of squelch discrimination output from each of the PS converters $53_1$–$53_N$ and inputs the multiplexed signal to the squelch insertion unit 56 so that the results of squelch discrimination are inserted into the VT-channel signal.

The BLSR information setting unit 61 sets BLSR information in registers $61_1$–$61_N$ of respective ones of N-number of STS channels, and the NUT information setting unit 62 sets NUT information in registers $62_1$–$62_N$ of respective ones of N-number of STS channels. Using the BLSR information and NUT information regarding all STS channels, a BLSR determination unit 63 determines whether squelch processing is to be executed or not, outputs a clear signal (mask signal) CLR to those latches $54_1$–$54_N$ that conform to STS channels to which squelch processing will not be applied, and latches the results of squelch discrimination only in those latches $54_1$–$54_N$ that conform to the STS channels that require execution of squelch processing.

(h) Activate Processing

The results of VT squelch discrimination are monitored and it is necessary to report the squelch monitoring information to a CPU in response to such a request. To accomplish this, an activate processor 64 is connected to the multiplexer 55, as shown in FIG. 25, and the squelch discrimination results of all N×28 VT channels are monitored. The activate processor 64 has a squelch-monitor information holding unit 64a for holding the squelch discrimination results of all N×28 VT channels, and a timer 64b for performing monitoring to determine, for each of the VT channels, whether the squelch state (the unrescuable state) has continued in excess of a set period of time. That is, as shown in FIG. 26, the activate processor 64 places information $SQL_{COM}$, which is shown to the CPU, at the high level when a squelch discrimination result SQL continues for longer than a set time ts, and places the information $SQL_{COM}$ at the low level as soon as the squelch discrimination result SQL reverts to the low level.

FIG. 27 is a diagram illustrating the structure of the activate processor. The activate processor includes a storage unit 65a for storing squelch discrimination results (raw information) HWt of all 28×N VT channels; an EOR circuit 65b for calculating information Δ(t, t−1) indicative of change of the raw information HWt; a latch 65c for storing the change information Δ(t, t−1) of all 28×N VT channels; a hardware unit 65d for calculating and outputting information SWt, which is seen by the CPU, in accordance with the logic table of FIG. 28; and a storage unit 65e for storing the information SWt of all 28×N VT channels prior to sampling.

(i) Service Selector Information

It is necessary to set whether a selector of the VT path protection switch unit (VT PSW 23) that follows the VT-signal line switching unit (VT TSI unit 22) (see FIG. 21) is used as a service selector or as a path selection switch of a UPSR.

FIG. 29 is a diagram useful in describing a case where the selector is used as a service selector. A BLSR ring can be expanded up to a maximum of 16 nodes. In order to accommodate a greater number of nodes, however, it is necessary to construct two or more BLSR rings and interconnect them, as illustrated in FIG. 29. A service selector (SS) implements rescue at the VT level at the interconnection between the ring systems. That is, the service selector (SS) of one ring performs path switching in VT-channel units for the purpose of performing rescue at the VT level with regard to a signal on an insertion side dropped directly from the other ring and a signal on the through side that enters from a secondary node within the same ring. For example, a VT signal that has been sent from a node A of a BLSR ring R1 enters a service selector SS2 of a BLSR ring R2 via an insertion side and a through side. The service selector SS2 normally selects the VT signal that enters from the through side and sends this signal to a node A'. If a failure in the transmission path occurs at point F under these conditions, the service selector SS2 subsequently selects the VT signal that enters from the insertion side and sends this signal to node A' to continue communication.

FIG. 30 is a diagram useful in describing a case where the selector is used as the path selection switch of a UPSR. Signals 77 and 78 enter a selector 76 from the EAST (default) side and WEST (non-default) side, respectively. Under the control of a PSW controller 75, the selector 76 normally selects and outputs the signal 77 on the default side. An ALM detector 70 on the default side and an ALM detector 71 on the non-default side detect alarms on the default and non-default sides from the input signals, set these alarms in an ALM register 72 and notify the PSW controller 75 of the occurrence of the alarms. Accordingly, when the ALM detector 70 on the default side detects an alarm during communication on the default side, the selector 76 selects the signal from the non-default side in response to control by the PSW controller 75, thereby allowing communication to continue. If, after changeover from the default path to the non-default path owing to a failure, the default path recovers from the failure, a switch is made back to the original default path upon elapse of a time WTR (wait to Restore) that has been set in a WTR control register 74. The WTR time is set in the WTR control register 74 by a CPU 73.

FIG. 31 is a diagram showing an arrangement in which a service selector information setting unit 66 is on the output side of the squelch processor. Components in FIG. 31 identical with those shown in FIG. 24 are designated by like reference characters. The VT-signal line switching unit (VT TSI) 22 and VT path protection SW unit (VT PSW) 23 are connected to the squelch insertion unit 56 successively in the order mentioned. The selector of the VT path protection SW unit (VT PSW) 23 sets, for all N×28 VT channels, whether the selector of the VT path protection switch unit (VT PSW) 23 is used as a service selector or as a path selection switch of a UPSR. A P/S converter 67 reads out the set service selector information successively in sync with the VT channels and inputs this information to the VT path protection SW unit (VT PSW) 23. The latter executes a selection operation as a service selector or as a UPSR path switch based upon the service selector information.

(j) Synchronous Control between Two VT Switches

In order to make possible the co-existence of VT switching and ATM switching, there is an ATM apparatus having two slots for VT and ATM switching and it is possible to use VT and ATM switches interchangeably. The reason for such an apparatus is that there are users who wish to perform switching at the ATM level, users who wish to perform switching at the VT level and users who wish to perform switching at both the ATM and VT levels. In order to perform VT-level switching, it is necessary to insert a VT switching package in each slot and pass respectively assigned VT channel signals (VT signals) between the two VT switches. This makes it necessary to accommodate for a phase difference between VT signals in the two VT switches.

FIG. 32 is a diagram showing an arrangement in which VT channel signals (VT signals) are passed between VT switches 81 and 82. STS signals output from an STS switch (STS TSI) 80 enter the VT switches 81, 82 one half at a time (DATA 1, DATA 2). The VT switches 81, 82, which are identical in structure, have pointer replacement units 81a, 82a, elastic memories (ES units) 81b, 82b, VT line switching units 81c, 82c, PSW/SS units 81d, 82d, and multiframe timing generators 81e, 82e, respectively. The elastic memories 81b, 82b, which are provided in front of the VT line switching units 81c, 82c, respectively, accommodate for a phase difference between the data of the two VT switches 81, 82. VT channel signals following VT pointer replacement are sent and received between the two VT switches 81, 82, the exchanged data is stored in the elastic memories (ES units) 81b, 82b and the data is then read out of the elastic memories (ES units) 81b, 82b at the multiframe timing, whereby accommodation is made for the phase difference between the data of the two VT switches 81, 82.

(k) Problems to be Solved by the Present Invention

First problem

With the conventional ADM apparatus, the NUT information setting registers $62_1$–$62_N$, the number of which is equivalent to the number (N) of STS-1 channels, are provided as shown in FIG. 24 in order to set the NUT information. However, unless STS signals of all N channels enter from the BLSR, i.e., unless all N channels are channels that are the object of BLSR rescue, some registers will be provided needlessly. The result is an inefficient circuit architecture. For example, in a case where the ADM apparatus is capable of cross connecting STS-1 signals of a maximum of N (=192) channels, it will suffice to provide NUT information for 96 STS-1 channels if the maximum transmission rate in the EAST and WEST directions of the BLSR is OC-48; N (=192) registers need not be provided.

Further, with regard to the setting as to whether a channel is a NUT channel in the prior art, four types of channels, namely a working channel on the EAST side, a protection channel on the EAST side, a working channel on the WEST side and a protection channel on the WEST side, will have been set up as one set in the interface on the line side. If the transmission rate is OC-48, however, the NUT information that has been set for working channels #1–#24 of STS-1 on the EAST side will be identical with. NUT information set for protection channels #24–#48 on the EAST side, working channels #1–#24 on the WEST side and protection channels #25–48 on the WEST side. Accordingly, it will suffice to set NUT information only for 24 (=$^{96}\!/_4$) EAST-side working channels. In a case where enhance NUT is supported (enhance NUT is NUT that makes it possible to designate a working channel and a protection channel individually), the information is the same as the NUT information that is set for the working/protection channels in the EAST direction and for the working/protection channels in the WEST direction. Accordingly, NUT information need be set for only 48 (=96/2) EAST-side working channels and EAST-side protection channels. Nevertheless, in accordance with the prior art, the STS signals after the cross-connect are not linked to the STS signals in the interface on the line side, and therefore NUT information is set individually for all channels (192) of the four types. The efficiency of such a circuit arrangement is not good.

Second problem

In order to identify an STS-1 channel that is the object of BLSR rescue, the BLSR information setting registers $61_1$–$61_N$, the number of which is equivalent to the maximum number (N) of STS-1 channels of the apparatus, are provided as shown in FIG. 24. However, BLSR information is information that is uniquely decided line by line in the interface on the line side of the apparatus. Providing BLSR information for every STS-1 channel after the cross connect in STS units means that needless registers are provided, resulting in an inefficient architecture. For example, if the maximum number of STS-1 channels that can be accommodated by a BLSR is n (OC-n), it will suffice to provide n/2-number of BLSR information setting registers in common for each of the EAST/WEST directions and working/protection. In case of OC-48, only 24 registers need be provided.

Further, according to the prior art, as shown in FIG. 24, BLSR determination circuits $63_1$–$63_N$ for performing a logic operation between BLSR information and NUT information in order to identify BLSR traffic, and mask processing circuits (latch circuits) $54_1$–$54_N$ for applying mask processing to the results of VT squelch discrimination using this BLSR determination information, are each required to be provided for the maximum number (N) of STS-1 channels of the apparatus. The result is an inefficient circuit arrangement.

Third problem

In order to notify the CPU of the VT squelch monitoring information, squelch monitoring information holding units are required in a number equivalent to the number of VT channels (N×28 channels) corresponding to the maximum VT access processing capacity of the apparatus. However, unless STS signals of all N channels enter from the BLSR, i.e., unless all N channels are channels that are the object of BLSR rescue, some registers will be provided needlessly. The result is an inefficient circuit architecture. Further, even if all STS signals enter from the BLSR, needless squelch monitoring information holding units corresponding to protection channels that are not the object of squelch insertion are provided. The result is an inefficient arrangement.

Fourth problem

In the prior art, whether the VT path protection switch unit (VT PSW) is to be operated as (1) a VT service selector or (2) a UPSR path selection switch is set by the service selector information (SS information). More specifically, SS information setting registers for each of N×28 VT channels, which is the maximum VT access processing capacity, is provided in the SS information setting unit 66 (FIG. 31) and the SS information of the prescribed VT channel is set in each register. The SS information is read out of the SS information setting unit 66 serially in conformity with the serial processing of the main signal and is delivered to the VT path protection switch unit. As a result, the VT path protection switch unit operates as a VT service selector or USPR path selection switch based upon the SS information for each VT channel.

The VT path protection switch unit (VT PSW) operates as a VT service selector only with regard to VT channels accommodated by an STS-1 channel that is the object of BLSR rescue. It will suffice if the VT path protection switch unit operates as a UPSR path selection switch with regard to VT channels other than these. This means that the SS information can be determined from the BLSR information and NUT information. Nevertheless, the prior art is such that since the VT path protection switch unit is situated after a VT line switching unit, SS information setting registers are provided individually irrespective of the setting of the NUT information and BLSR information. Such redundant provision of registers results in circuitry that is not efficient.

Fifth problem

In order to make it possible for VT switching and ATM switching to co-exist, the ADM apparatus is provided with two slots for VT/ATM switches and it is so arranged that a VT switch and ATM switch can be interchanged. If only VT switching is performed in such an ADM apparatus, it is required that the assigned VT channel signals (VT signals) be passed between these VT switches, as shown in FIG. 32. For this reason, a phase difference between the data of the two VT switches is accommodated for by sending and receiving data, following VT pointer replacement, between the two VT switches, storing the data in an elastic memory provided at a position ahead of the line switching unit and reading out the data in sync with multiframe timing. However, since each VT switch performs VT pointer replacement based upon an independent multiframe timing, the phase difference between the data of the two VT switches after VT pointer replacement increases. This makes it necessary to provide an elastic memory of greater capacity in order to accommodate for this phase difference. The result is an inefficient circuit arrangement.

SUMMARY OF THE INVENTION

Accordingly, an object of the present invention is to provide a more compact apparatus by reducing the number of registers for setting NUT information.

Another object of the present invention is to provide a more compact apparatus by reducing the number of registers for setting BLSR information, the number of BLSR determination circuits and the number of mask processing circuits for VT squelch.

Another object of the present invention is to provide a more compact apparatus by reducing the number of channels necessary for activate processing, thereby reducing the number of registers for holding squelch monitoring information.

Another object of the present invention is to provide a more compact apparatus by reducing the number of existing service selector setting registers.

Another object of the present invention is to eliminate an elastic memory, which is for absorbing a phase difference between VT signals of VT switches and storing the VT signals, in a transmitting apparatus in which VT channel signals (VT signals) are passed between two VT switches.

Let a direction in which a signal is input to the EAST side and output from the WEST side of each node be a first direction, let a direction in which a signal is input to the WEST side and output from the EAST side of each node be a second direction, and let the maximum number of STS-1 channels that can be accommodated by a BLSR be n.

According to the present invention, NUT information setting registers for n/4-number of channels, i.e., NUT information setting registers only for working channels in the first direction, are provided, and NUT information for the working channels in the first direction is set in these registers. The NUT information is shared as NUT information of (1) the working channel in the first direction, (2) the protection channel in the first direction, (3) the working channel in the second direction and (4) the protection channel in the second direction. In a case where enhance NUT is supported, NUT information setting registers only for n/2-number of channels, i.e., for the working channel in the first direction and the protection channel in the first direction, are provided, the NUT information for the working channel in the first direction and the NUT information for the protection channel in the first direction is set in these registers, the NUT information for the working channel in the first direction is shared as NUT information for the working channels in the first and second directions, and the NUT information for the protection channel in the first direction is shared as NUT information for the protection channels in the first and second directions. If this arrangement is adopted, the size of the apparatus can be reduced by reducing the number of registers for setting the NUT information.

According to the present invention, determination of channels that are the object of squelch is performed using NUT information of STS channels accommodated by the BLSR and BLSR-type setting information that indicates the BLSR transmission rate (STS-12, STS-48, etc.). If this arrangement is adopted, the number of registers for setting BLSR information can be reduced, the number of channels requiring BLSR determination processing is diminished, thereby making it possible to reduce the number of BLSR determination circuits and mask processing circuit for VT squelch. This results in a more compact apparatus.

According to the present invention, activate processing is applied to VT squelch discrimination results of VT channels accommodated by an STS channel that is the object of BLSR rescue, and the results of VT squelch discrimination after activation are cross connected and reported to a CPU on a per-STS-channel basis utilizing STS line setting information (STS cross-connect information) of the main signals. If this arrangement is adopted, it will suffice to hold only squelch monitoring information for the number of STS-1 channels accommodated by the BLSR. This makes it possible to reduce the number of activate processing channels and, hence, to reduce the size of the apparatus.

According to the present invention, channel-by-channel BLSR determination results for use in squelch masking are cross connected based upon STS line setting information (STS-cross connect information) and VT line setting information (VT cross-connect information) of the main signals, thereby generating SS information that indicates whether a VT path protection switch is to be operated as a VT service selector. If this arrangement is adopted, existing service selector setting registers can be eliminated, thereby making it possible to reduce the size of the apparatus.

According to the present invention, multiframe timings in two VT switches are made to coincide and VT pointers are replaced at each VT switch using this multiframe timing as a reference, thereby minimizing the phase difference between the data of the two VT switches. If this arrangement is adopted, it is unnecessary to provide an elastic memory for absorbing the phase difference between the data of two VT switches, thereby enabling the apparatus to be made more compact.

According to the present invention, one VT switch serving as a master delivers a pulse BMFT, which indicates the timing of a reference multiframe, to the other VT switch serving as a slave in order to make the multiframe timing positions agree in the two VT switches. The pulse BMFT indicative of the timing of the reference multiframe is a timing pulse of 50% duty indicating a position one-half frame ahead of a multiframe timing pulse MF1 in the master VT switch. The slave VT switch accepts the reference multiframe timing pulse BMFT of 50% duty, implements the prescribed protection and generates a multiframe timing pulse MF2 using, as the multiframe timing, the position of a frame timing pulse F2, which is generated within the slave VT switch, that first arrives from the position of the above-mentioned multiframe timing pulse. If this arrangement is adopted, it is possible to make the multiframe timings coincide reliably without the influence of one-shot noise.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 1A to 1C are diagrams illustrating the overall structure of an ADM apparatus according to the present invention;

FIG. 5 shows an example of the setting of NUT information;

FIG. 6 shows an example of the setting of BLSR type;

FIGS. 7A to 7C are tables illustrating examples in which the scale of circuitry according to the present invention is compared with that of the prior-art apparatus;

FIG. 26 is a diagram useful in describing a squelch monitor according to the prior art;

FIG. 27 illustrates an activate processor according to the prior art;

FIG. 28 is a diagram useful in describing logical operations performed by hardware according to the prior art;

DESCRIPTION OF THE PREFERRED EMBODIMENT (A) ADM Apparatus According to the Present Invention (a) Structure FIGS. 1A to 1C are diagrams illustrating the overall structure of a transmitting apparatus (VT cross-connect apparatus) having an ADM function according to the present invention. The apparatus is constituted by an STS cross-connect unit 100, a VT cross-connect unit 200, an INF unit 300 on the input side and an INF unit 400 on the output side.

Figure 1C:
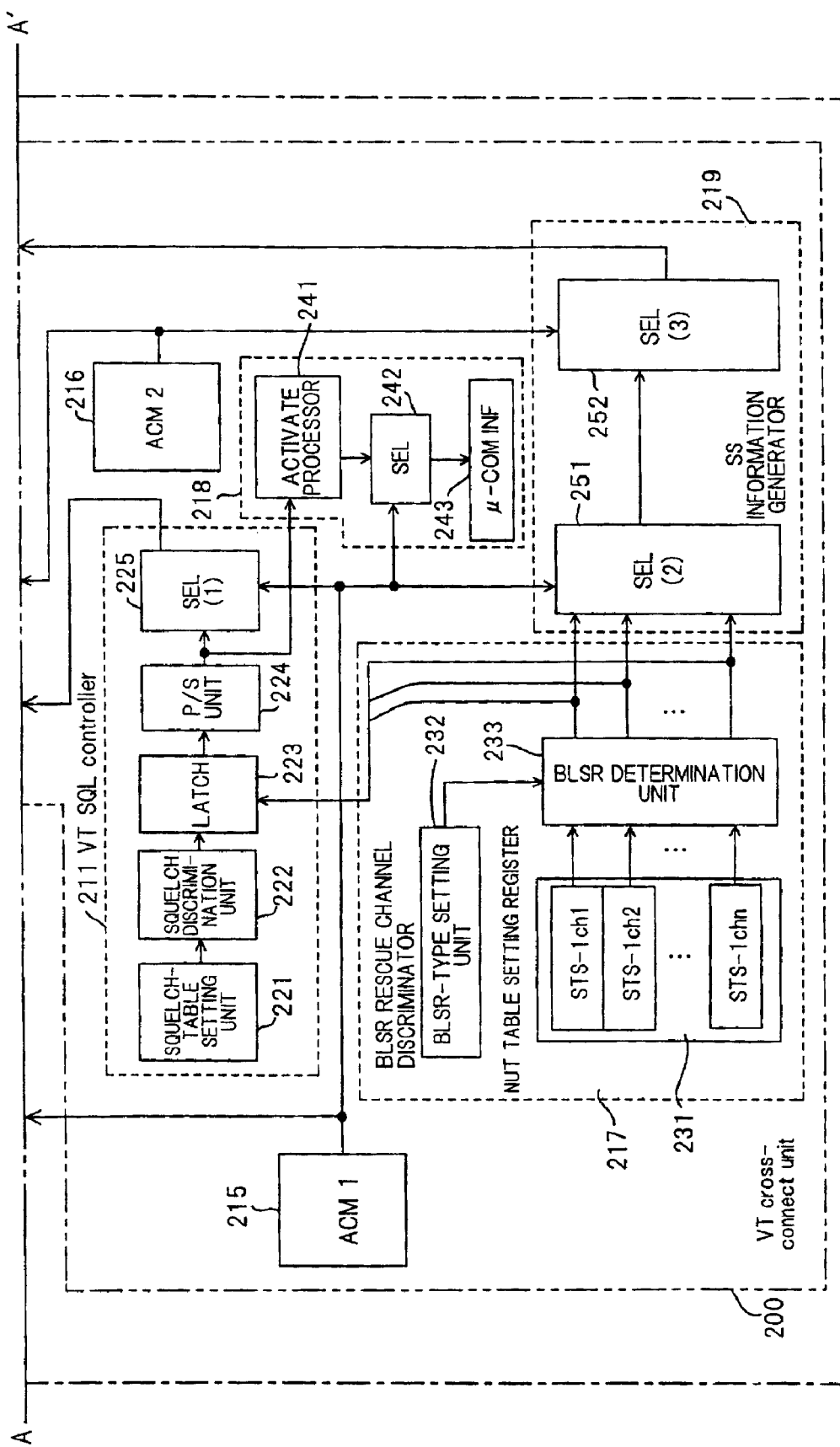

The STS cross-connect unit 100 cross connects STS signals, and the VT cross-connect unit 200 executes squelch processing and cross connects VT signals. Line terminators $300_1$–$300_2$ on the input side convert optical signals, which enter from optical transmission lines $500_1$, $500_2$ on the EAST/WEST sides of the ring structure, to electrical signals and perform STS termination processing, and tributary INF units $300_3$–$300_n$ send lower order signals such as DS1, which enter from the tributary side, upon multiplexing the VT signals into an STS signal. A SONET/SDH transport unit $400_1$ on the output side converts an STS signal, which enters from the STS cross-connect unit 100, to an optical signal, attaches overhead to the optical signal and then sends the signal to an optical transmission line on the EAST/WEST side. An STM accommodating unit $400_2$ decomposes an STM signal into VT signals, makes these lower order signals such as DS1 and sends these signals to the tributary side.

The STS cross-connect unit 100 includes (1) STS-signal line switching units 111, 112 for performing cross-connect at the STS level; (2) an STS path terminating unit 113 for performing STS termination processing and separating an STS signal into VT signals; (3) an STS path protection switch 114 for performing STS path protection; (4) an STS multiplexer (STS MUX) 115 for multiplexing, into an STS signal, VT signals cross connected at the VT level; (5) an STS-signal line switching unit 116 for cross connecting, at the STS level, the STS signal output from the STS multiplexer 115; and (6) and a selector (SEL unit) 117 for selecting one of the STS signals cross connected by the STS-signal line switching unit 111 and STS-signal line switching unit 116.

The VT cross-connect unit 200 includes (1) a VT SQL controller 211 for controlling VT squelch; (2) a VT SQL insertion unit 212 for inserting the result of squelch; (3) a VT-signal line switching unit 213 for performing cross-connect in VT-channel units, i.e., at the VT level; (4) a VT path protection switch 214 for acting as a VT service selector or as a path protection switch based upon UPSR; (5) an STS cross-connect information holding unit (ACM1) 215 for holding line switching information (STS cross-connect information) on the STS level of the main signal; (6) a VT cross-connect information holding unit (ACM2) 216 for holding line switching information (VT cross-connect information) on the VT level of the main signal; (7) a BLSR rescue channel discriminator 217 for discriminating, from NUT information and BLSR information, a VT channel that is to be rescued by a BSLR, and for outputting this VT channel; (8) a VT squelch monitor/notification unit 218 for monitoring the results of VT squelch discrimination and reporting this to a CPU in response to a request; and (9) an SS information generator 219 for generating, on the basis of the BLSR rescue channel information (information representing the results of BLSR determination), SS information as to whether the VT path protection switch 214 is used as a service selector. Let a direction in which a signal is input to the EAST side and output from the WEST side of each node be a first direction and let a direction in which a signal is input to the WEST side and output from the EAST side of each node be a second direction.

The VT SQL controller 211 includes a squelch-table setting unit 221 for setting a squelch table for each VT channel accommodated in each STS working channel in the first direction of the BLSR; a squelch discrimination unit 222 for performing squelch discrimination for each VT channel accommodated in each STS working channel in the first direction; a latch 223 for latching the results of squelch on a per-VT-channel basis; a P/S unit 224 for serially outputting the squelch results of VT channels from the latch 223 while subjecting these results to a parallel-to-serial conversion; and a selector 225 which, in accordance with STS cross-connect information (line switching information) of the main-signal data, interchanges the squelch results at the STS level and inputs the results to the VT SQL insertion unit 212.

The BLSR rescue channel discriminator 217 includes a NUT information setting register 231 in which is set NUT information indicating whether each STS working channel in the first direction of the BLSR is a NUT channel; a BLSR-type setting unit 232 for setting BLSR type, which indicates the BLSR transmission rate (OC-12, OC-48, etc.); and a BLSR determination unit 233 for determining, on the basis of NUT information and BLSR type, an STS channel (BLSR rescue channel) to be rescued by the BLSR, and outputting the channel to the VT SQL controller 211 and SS information generator 219. The latch 223 of the VT SQL controller 211 stores the results of squelch discrimination of the BLSR rescue channel (the STS channel that is the object of squelch discrimination) and masks, and does not store, the results of squelch discrimination of an STS channel that does not require rescue.

The VT squelch monitor/notification unit 218 includes an activate processor 241 which, before the results of squelch discrimination of a BLSR rescue channel are interchanged based upon STS line setting information (STS cross-connect information) of the main-signal data, executes activate processing with regard to these squelch discrimination results; a selector 242 which, based upon STS line setting information of main-signal data, interchanges and outputs the results of squelch discrimination following activate processing; and a μ-COM INF unit 243 which executes interface processing for sending the CPU the results of squelch discrimination following interchange.

The SS information generator 219 includes a selector 251 which, on the basis of the STS line setting information (STS cross-connect information) of the main-signal data, interchanges the results of BLSR determination (information indicating whether an STS-1 channel accommodated by the BLSR is rescued by the BLSR) output from the BLSR determination unit 233 of the BLSR rescue channel discriminator 217; and a selector 252 for interchanging VT channels, which are accommodated by each BLSR rescue channel interchanged, based upon line switching information (VT cross-connect information) at the VT level, and instructing the VT path protection switch 214 to act as a service selector with respect to the VT channels after interchange.

(b) Operation

The line terminators $300_1$–$300_2$ and tributary terminators $300_3$–$300_n$ line- or path-terminate the signals sent from the line side and subscriber side, branch the signals after termination and deliver them to the STS-signal line switching units 111, 112.

Among the STS signals that arrive from the line side and subscriber side, the STS-signal line switching unit 111 selects STS signals that are allowed to pass through (STS signals that do not require cross-connect at the VT level) and performs line switching. The STS path protection switch 114 operates as a path protection switch in order to perform signal rescue at the STS level.

From STS signals that arrive from the line side and subscriber side, the STS-signal line switching unit 112 arbitrarily selects STS signals (VT-accessed STSs) that will be cross connected at the VT level. The selection of the VT-accessed STSs is executed in accordance with selection information from the STS cross-connect information holding unit (ACM1) 215. The STS path terminating unit 113 subjects STS signals that have been selected as VT-accessed STSs to STS path termination processing and decomposes the signals into VT signals. The squelch insertion unit 212 inserts VT squelch (results of squelch discrimination) into the particular VT channel. The VT-signal line switching unit 213 performs line switching in units of VT channels in accordance with VT line setting information from the VT cross-connect information holding unit (ACM2) 216, and the VT path protection switch 214 acts as a VT-signal path protection switch or as a service selector switch. The STS multiplexer (STS MUX unit) 115 multiplexes the VT-processed VT signals into an STS signal and inputs the STS signal to the STS-signal line switching unit 116. The latter performs STS-level line switching again.

The selector 117 selects whether the STS signal on the STS pass-through side or the signal on the side of the VT-accessed STSs is to be output from the apparatus. The selected signal is output via either the SONET/SDH transport unit $400_1$ or STM accommodating unit $400_2$, to the line side and subscriber (tributary) side.

The squelch-table setting unit 221 in the VT SQL controller 211 stores a squelch table, which has been set up in advance, from a CPU or the like. Using the set squelch table and the far-end node ID sent from another apparatus on the network at the time of failure, the squelch discrimination unit 222 determines whether squelch will be applied. The latch 223 holds the results of discrimination by the squelch discrimination unit 222, the P/S unit 224 reads out the latched SQL discrimination result information serially in STS-channel units, and the selector 225 selects the SQL discrimination result information in accordance with the STS line setting information (STS cross-connect information) from the STS cross-connect information holding unit (ACM1) 215 and links this information to the VT channel of the main signal.

The NUT information setting register 231 stores NUT information, which has been set in advance, from a CPU or the like, the BLSR-type setting unit 232 stores BLSR-type information, which indicates the set BLSR transmission rate, from a CPU or the like, and the BLSR determination unit 233 uses the set NUT information and BLSR-type information to determine whether the traffic is BLSR traffic (a channel that is the object of BLSR rescue). The NUT information setting unit 231 and the BLSR determination unit 233 are provided solely for the number of STS working channels in the first direction assigned to the BLSR transmission line. The result of BLSR determination are input to the latch 223 of the VT SQL controller 211 and is used as VT-squelch mask information.

The selector 251 of the SS information generator 219 selects and outputs each result of BLSR determination at a timing in accordance with the STS line setting information being held by the STS cross-connect information holding unit (ACM1) 215. As a result, STS-level channel interchange of the results of BLSR determination is performed and information indicative of the results is linked to the VT channel of the main signal after line switching at the VT level. This BLSR determination result information after interchange is delivered to the VT path protection switch 214. The latter uses the entered BLSR determination result as service selector information, operates as a service selector switch with respect to the VT channel that is BLSR traffic (the channel that is the object of BLSR rescue), and operates as a UPSR path selection switch with respect to other traffic.

(B) Squelch Processing

Figure 2:
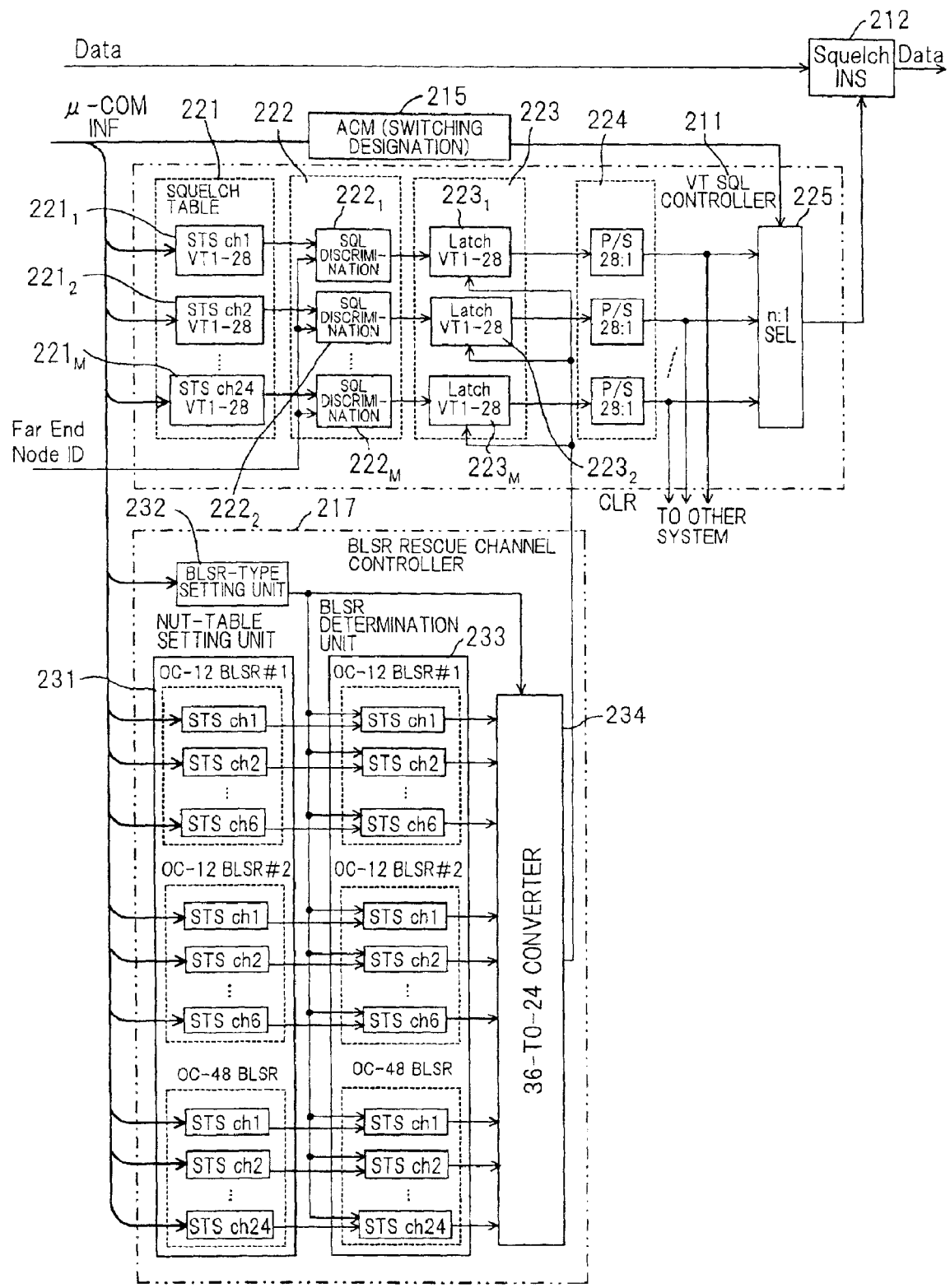
FIG. 2 is a block diagram illustrating components associated with squelch processing.

FIG. 2 is a block diagram illustrating components associated with squelch processing. Components in FIG. 2 identical with those shown in FIG. 1 are designated by like reference characters.

Figure 3A:
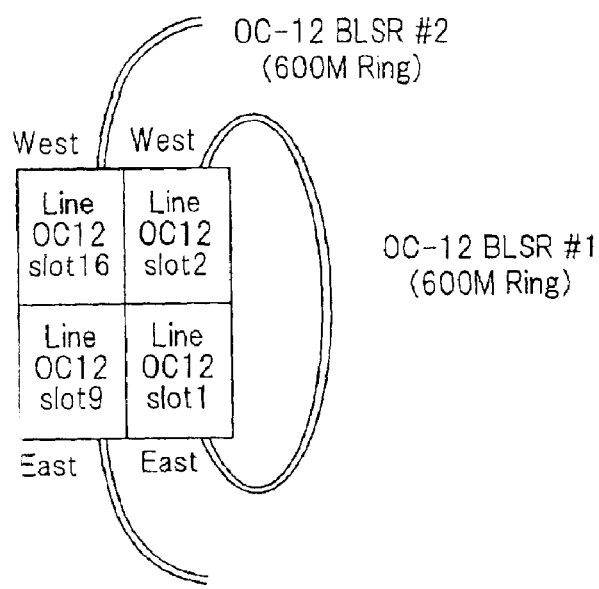
FIGS. 3A and 3B are diagrams useful in describing the relationship between BLSR types and slots.
Figure 3B:
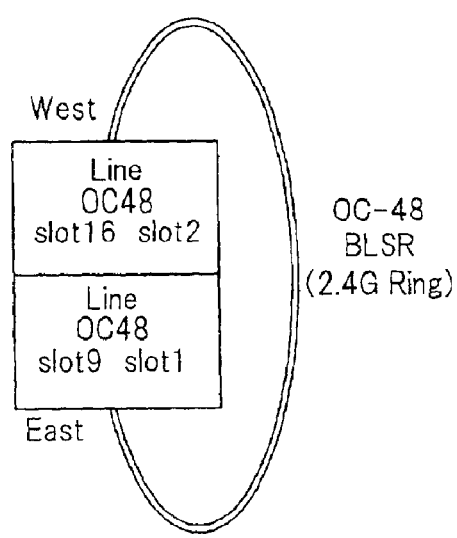

The type of BLSR connected to an ADM apparatus is decided in advance. For example, (1) an OC-48 BLSR ring, (2) an OC-12 BLSR ring #1 and (3) an OC-12 BLSR ring #2 are connectable to the ADM apparatus. The slot into which the BLSR of each type is inserted into the ADM apparatus is decided in advance. (1) In case of OC-12 BLSR ring #1, slot 1 is on the EAST side and slot 2 is on the WEST side, as illustrated in FIG. 3A; (2) in case of OC-12 BLSR ring #2, slot 9 is on the EAST side and slot 16 is on the WEST side; (3) in case of the OC-48 BLSR ring, slots 1, 9 are on the EAST side and slots 2, 16 are on the WEST side, as shown in FIG. 3B.

Figure 4:
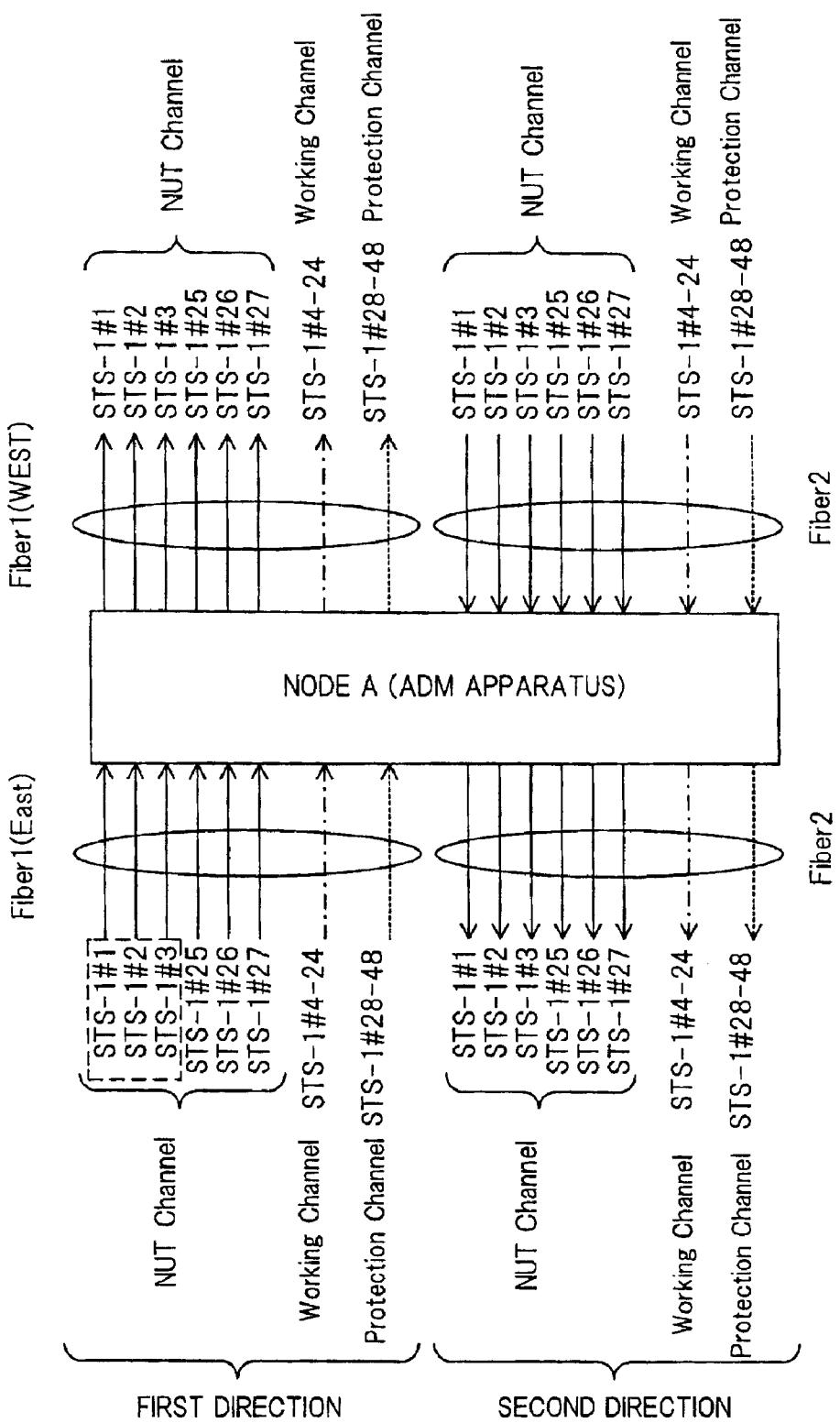
FIG. 4 is a diagram useful in describing the correspondence between NUT information and NUT channels.

If an STS channel accommodated by the OC-48 or OC-12 BLSR ring (namely a channel that is the object of rescue) is not a NUT channel, then the channel is a channel rescued by the BLSR. In case of OC-48, STS-1 #1 to #24 on the EAST side (first direction) are working channels, STS-1 #25 to #48 on the EAST side (first direction) are protection channels, STS-1 #1 to #24 on the WEST side (second direction) are working channels and STS-1 #25 to #48 on the WEST side (second direction) are protection channels. If STS-1 #1 to #3 on the EAST side are set as NUT channels by the NUT information, as shown in FIG. 4, then STS-1 #25 to #27 on the EAST side and STS-1 #1 to #3, STS-1 #25 to #27 on the WEST side also become NUT channels. Though the foregoing is the case for OC-48, the same will hold also in the case of OC-12.

Thus, if the BLSR type is OC-12 ring #1 or OC-12 ring #2, it will suffice to set NUT information for the working channels STS-1 #1 to #6 on the EAST side. If the BLSR type is an OC-48 ring, it will suffice to set NUT information for the working channels STS-1 #1 to #24 on the EAST side. To accomplish this, the NUT information setting register 231 in FIG. 2 is provided with registers for setting a total of 36 items of NUT information and sets NUT information of working channels #1 to #6 on the EAST side of OC-12 ring #1, NUT information of working channels #1 to #6 on the EAST side of OC-12 ring #2 and NUT information of working channels #1 to #24 on the EAST side of the OC-48 ring. In actuality, four 16-bit registers are provided, as shown in FIG. 5 (shown as D15-0), and NUT information of each BLSR type is set in respective ones of these registers.

Further, BLSR type (OC-12 ring #1, OC-12 ring #2, OC-48 ring) is set in the BLSR-type setting unit 232. FIG. 6 shows an example of the setting of BLSR type. Here BLSR type is set by three bits. The OC-48 ring is set by "001", OC-12 ring #1 is set by "010", and OC-12 ring #2 is set by "100". It should be noted that BLSR type can be set using two bits as well.

The BLSR determination unit 233 decides the BLSR rescue channel based upon the BLSR type and NUT information, inputs the BLSR rescue channel information (BLSR determination results) to a 36-to-24 converter 234, and the latter outputs 24 results of BLSR determination. There are three BLSR types, namely OC-12 ring #1, OC-12 ring #2 and the OC-48 ring. The maximum number of STS-1 channels that are the object of rescue is 24. For this reason the 36-to-24 converter 234 outputs the 24 results of BLSR determination.

STS channels that are the object of squelch processing are channels (channels that are the object of BLSR rescue) that are not NUT channels among the STS channels (channels that are the object of BLSR rescue) accommodated by the BLSR. The maximum number of these STS channels is 24. Accordingly, the squelch-table setting unit 221 has squelch tables $221_1$–$221_M$ (M=24) each for dealing with VT channels VT1–VT28 of each of the STS channels ch1–ch24. The squelch-table setting unit 221 records, from μ-COM, connection-destination information (connection-destination node IDs on the EAST and WEST sides) of VT channels corresponding to each of the tables. It should be noted that the STS channels ch1–ch24 in the squelch-table setting unit 221 are channels before the channels that are the object of BLSR rescue are cross connected by the STS-signal line switching unit 112.

SQL discrimination units $222_1$–$222_M$ (M=24) each have discriminators for 28 VT channels, compare, for each of 28×M VT channels, a far-end node ID with node IDs that have been set in the squelch tables, and determine whether VT squelch is to be applied or not. Latches $223_1$–$223_M$ latch the results of discrimination of BLSR rescue channels based upon the results of BLSR discrimination. The squelch discrimination results of channels other than those that are the object of rescue are masked and not latched. P/S converters $224_1$–$224_M$ each serially convert and output squelch discrimination results of 28 VT channels stored in respective ones of latches $223_1$–$223_M$. On the basis of STS cross-connect information that has been stored in the STS cross-connect information holding unit (ACM1) 215, the selector 225 selects, in regular order, the squelch discrimination results output serially from the P/S converters $224_1$–$224_M$ and inputs the results to the squelch insertion unit 212 at the timing of the working/protection channels on the EAST side and the working/protection channels on the WEST side. The squelch insertion unit 212 inserts the entered results of squelch discrimination into the VT signals of the applicable working/protection channels on the EAST side and the working/protection channels on the WEST side.

In summary, data which enters from the upper left of FIG. 2 is a signal that is the result of decomposing, into VT signals, STS signals that have been selected as VT-accessed STSs, and results of VT squelch discrimination are inserted into the applicable VT channels by the squelch insertion unit 212.

The squelch-table setting unit 221 stores set squelch tables from a CPU or the like, and the squelch discrimination unit 222 uses a set squelch table and a far-end node ID sent from another apparatus on the network at the time of failure to determine whether squelch will be applied. The latch 223 latches the results of discrimination performed by the squelch discrimination unit 222. The latched information is output from the P/S unit 224 serially STS by STS, and the selector 225 selects information in accordance with line setting information from the STS cross-connect information holding unit (ACM1) 215. The squelch insertion unit 212 inserts the results of squelch discrimination, which is sent from the selector 225, into main signals of the corresponding VT channels.

The NUT information setting register 231 stores set NUT information from a CPU or the like. The NUT information is prepared only for working channels on the EAST side used by the BLSR. In FIG. 2, NUT information for [six channels for OC-12 BLSR]×[24 channels for OC-48 BLSR] is provided as an example in an apparatus corresponding to an OC-48 BLSR arrangement or OC-12 BLSR×2 arrangement.

The BLSR-type setting unit 232 stores BLSR-type information, which indicates the set BLSR transmission rate from a CPU or the like, and the BLSR determination unit 233 uses the set NUT information and BLSR-type information to determine whether the channel corresponding to the working channel on the EAST side is actually BLSR traffic (a channel that is the object of BLSR rescue). Since results of BLSR determination exist for both an OC-48 BLSR and an OC-12 BLSR, either one is selected in the 36-to-24 converter 234 based upon the BLSR-type information and the results of VT squelch discrimination are delivered to the latch 223 for the purpose of mask processing.

Thus, in accordance with the present invention, NUT information registers need be provided only for EAST-side working channels used by the BLSR. This makes it possible to reduce the number of registers for setting NUT information, to reduce the amount of circuitry and to alleviate the processing load on the CPU. If the maximum VT access processing capability of the apparatus is 10 Gbps (=192 STS-1 channels), a comparison of the number (N) of NUT information setting registers in the prior art and number (M) of registers in the present invention will be as indicated in FIG. 7A.

Further, in accordance with the present invention, BLSR determination can be carried out using NUT information linked to channels (channels that are the object of BLSR rescue) accommodated by the BLSR and BLSR-type setting information indicative of the BLSR transmission rate. This makes it possible to reduce the number of registers for setting the BLSR. In addition, the number of channels for BLSR determination processing can be reduced and it is possible to reduce BLSR determination circuitry and mask processing circuitry for VT squelch. If the maximum VT access processing capability of the apparatus is 10 Gbps (=192 STS-1 channels), a comparison of the number (N) of BLSR information setting registers in the prior art and number (L) of BLSR-type registers in the present invention will be as indicated in FIG. 7B. In addition, according to the present invention, it is possible to reduce the number of SQL activate processing channels. In the comparison example shown in FIG. 7C, if the maximum VT access processing capability of the apparatus is 10 Gbps, a comparison of the number of SQL activate processing channels (N×VT) in the prior art and the number of SQL activate processing channels (M×VT) in the present invention will be as indicated in FIG. 7C.

(C) VT Squelch Monitor and Notification Processing

Figure 8:
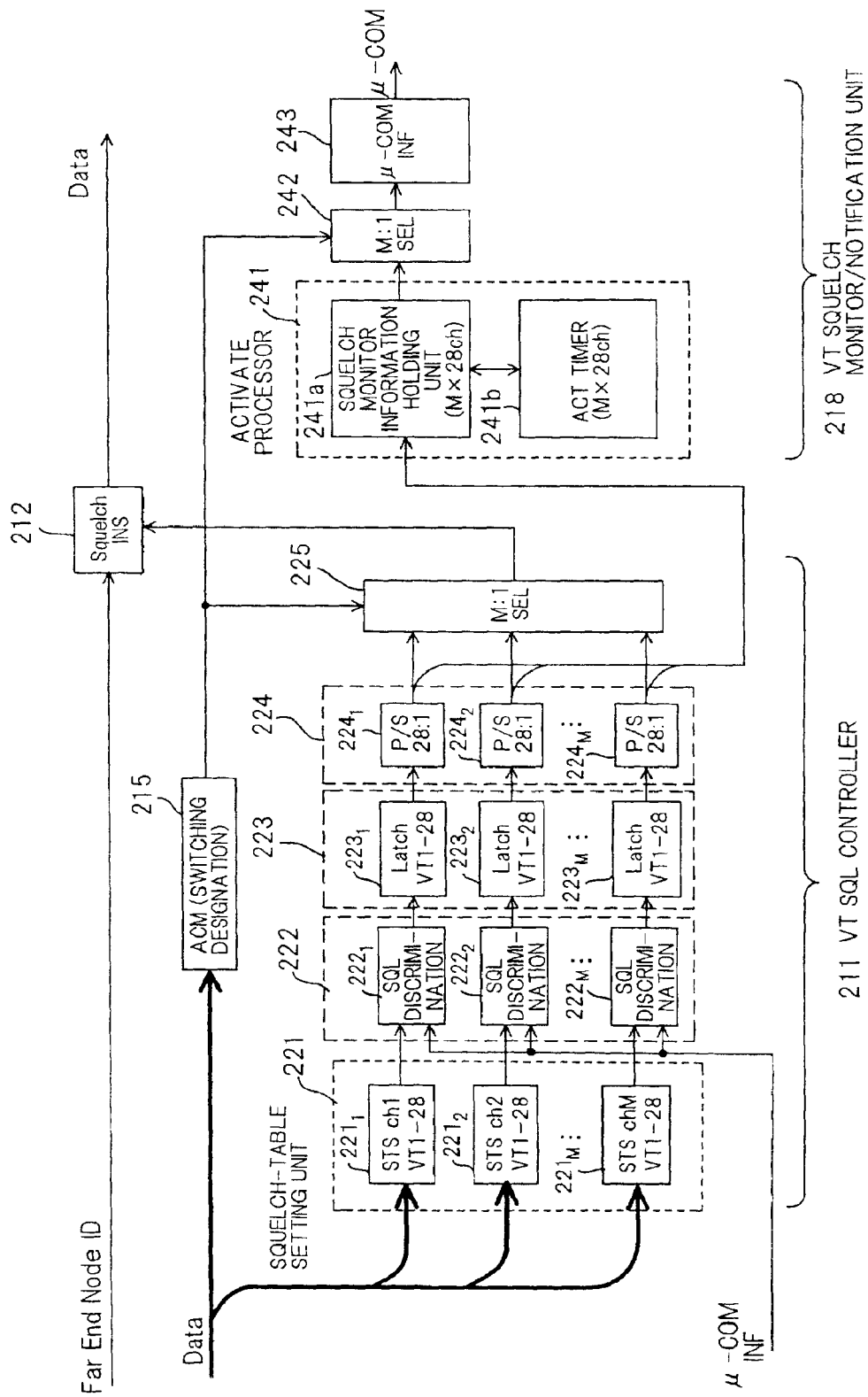
FIG. 8 is a block diagram of an arrangement in which an activate processor is connected to a VT SQL controller according to the present invention.

FIG. 8 is a block diagram of an arrangement in which a VT squelch monitor/notification unit is connected to a VT SQL controller according to the present invention. Components in FIG. 8 identical with those shown in FIGS. 1 and 2 are designated by like reference characters.

In an ADM apparatus, the results of squelch discrimination are monitored and a report is made to the CPU in response to a request. Before the results of squelch discrimination are interchanged based upon the STS-line setting information (STS cross-connect information) of the main-signal data, therefore, the results are input from the P/S unit 224 to the VT squelch monitor/notification unit 218, where squelch results concerning BLSR rescue channels are monitored.

The VT squelch monitor/notification unit 218 includes the activate processor 241 for executing activate processing based upon the squelch discrimination results; the selector 242 for interchanging, on the basis of STS-line setting information of the main-signal data, the squelch discrimination results after the activate processing; and the μ-COM INF unit 243, which executes interface processing to send the CPU the squelch discrimination results after the interchange thereof.

The activate processor 241 includes a squelch monitor information holding unit 241a for holding the results of squelch discrimination for all VT channels (M×28, where M=24) of channels that are the object of BLSR rescue, and an activate timer 241b for monitoring whether the squelch state (the unrescuable state) has continued in excess of a set period of time with regard to all M×28 VT channels. The operation of the activate processor 241 is the same as that of the prior-art example shown in FIGS. 26 to 28. The difference is that if the number of STS channels that can be processed by the ADM apparatus is N (=192), the activate processing in the prior-art example monitors squelch results for all N×28 VT channels, whereas in the present invention it suffices to monitor squelch results for M×28 VT channels if the number of channels that are the object of BLSR rescue is M (=24).

The activate processor 241 executes activate processing to monitor, by an activate timer, the continuity of SQL discrimination results in each VT channel read out of the P/S unit 224 serially in STS units. The results of squelch discrimination of M×28 VT channels in the M-number of channels that are the object of BLSR rescue become the object of activate processing, and the squelch monitor information holding unit 241a and activate timer 241b are prepared for M×28 channels. FIG. 8 takes VT 1.5 as an example and illustrates a case where 28 VT channels are linked to the STS-1 channel.

On the basis of STS-line setting information of the main-signal data, the selector 242 selects, in regular order, M×28 SQL discrimination results after execution of activate processing and outputs the results at the timing of the working/protection channels on the EAST side and working/protection channels on the WEST side. As a result, STS-level channel interchange of SQL discrimination results following activate processing is carried out, and the μ-COM INF unit 243 reports the squelch-monitor information appropriately following interchange in response to a request from the CPU.

Thus, in accordance with the present invention, activate processing is applied, prior to cross connect, to M×28 VT squelch discrimination results in channels that are the object of BLSR rescue, M×28 VT squelch discrimination results following activate processing are interchanged utilizing the STS-line setting information of the main signals and the results are reported to the CPU. As a result, it is possible to reduce the number of active processing channels. For example, if the maximum VT access processing capability of the apparatus is 10 Gbps (=192 STS-1 channels), a comparison of the number (N×VT) of activate processing channels in the prior art and number (M×VT) of processing channels in the present invention will be as indicated in FIG. 7C.

(D) Control for Generating SS Information

Figure 9:
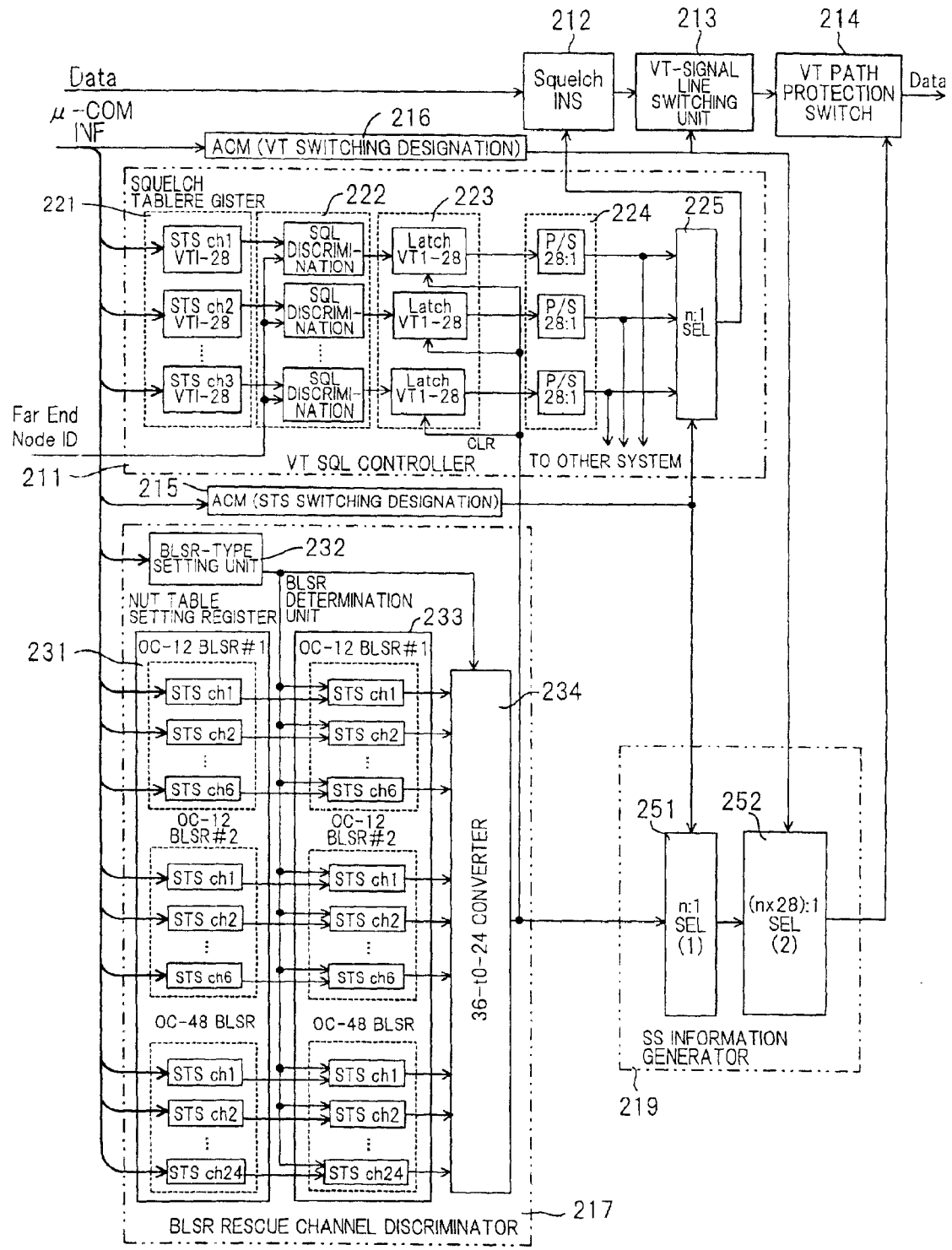
FIG. 9 is a block diagram in which an SS information generator is connected to a BLSR rescue channel discriminator.

FIG. 9 is a block diagram in which the SS information generator 219 of the present invention is connected to the BLSR rescue channel discriminator 217. Components in FIG. 9 identical with those shown in FIGS. 1 and 2 are designated by like reference characters.

It is necessary to set whether a selector (not shown) contained in the VT path protection switch 214 that follows the VT-signal line switching unit 213 is to operate as a service selector or as a USPR path selection switch. To achieve this, it will suffice to make a setting such that the selector will operate as a service selector with respect to VT channels accommodated by BLSR rescue channels and as a USPR path selection switch with respect to other VT channels.

Accordingly, the SS information generator 219 of the present invention generates SS information (service selector information) using BLSR determination information that specifies BLSR rescue channels, and the VT path protection switch 214 is set by this SS information so that the selector will operate as a VT service selector or as a USPR path selection switch.

The SS information generator 219 has the selector 251 which, on the basis of the STS line setting information (STS cross-connect information) of the main-signal data, interchanges the results of BLSR determination (information indicating whether an STS-1 channel accommodated by the BLSR is rescued by the BLSR) output from the BLSR rescue channel discriminator 217; and the selector 252 for interchanging VT channels, which are accommodated by each BLSR rescue channel interchanged, based upon line switching information (VT cross-connect information) at the VT level, and instructing the VT path protection switch 214 to act as a service selector with respect to the VT channels after interchange.

The selector 251 selects and outputs the result of BLSR determination of each STS channel at a timing in accordance with the STS cross-connect information being held by the STS cross-connect information holding unit (ACM1) 215. As a result, STS-level channel interchange of the results of BLSR determination is performed and the information is linked to the VT channel of the main signal after STS channel switching. The selector 252 further selects and outputs the BLSR determination results, which have been linked to the VT channel at a timing in accordance with the VT cross-connect information that has been stored in the VT cross-connect information holding unit (ACM2) 216. Accordingly, VT-level channel interchange of the BLSR determination results is performed and the results are linked to the VT channel of the main signal after the line switching at the VT level. The information representing the results of BLSR determination after interchange is delivered to the VT path protection switch 214. The latter uses the entered BLSR determination result as VT service selector information, operates as a service selector switch with respect to the VT channel that is BLSR traffic (the channel that is the object of BLSR rescue), and operates as a UPSR path selection switch with respect to other traffic.

Thus, in accordance with the present invention, it is possible to reduce the number of registers (namely for N×28 channels) required in the prior art to set whether the VT path protection switch is to operate as a VT service selector. This makes it possible to reduce the amount of circuitry and to lighten the processing load on the CPU.

(E) Control of Phase Difference between VT Switches

In order to make possible the co-existence of VT switching and ATM switching, there is an ATM apparatus having two slots for VT and ATM switching and it is possible to use VT and ATM switches interchangeably. In a case where only VT switching is performed by such an ADM apparatus, a VT switching package is inserted into each slot and VT-channel signals (VT signals) are interchanged between two VT switches. In order to interchange the VT signals, it is necessary to accommodate for the phase difference between the VT signals in the two VT switches.

Figure 10:
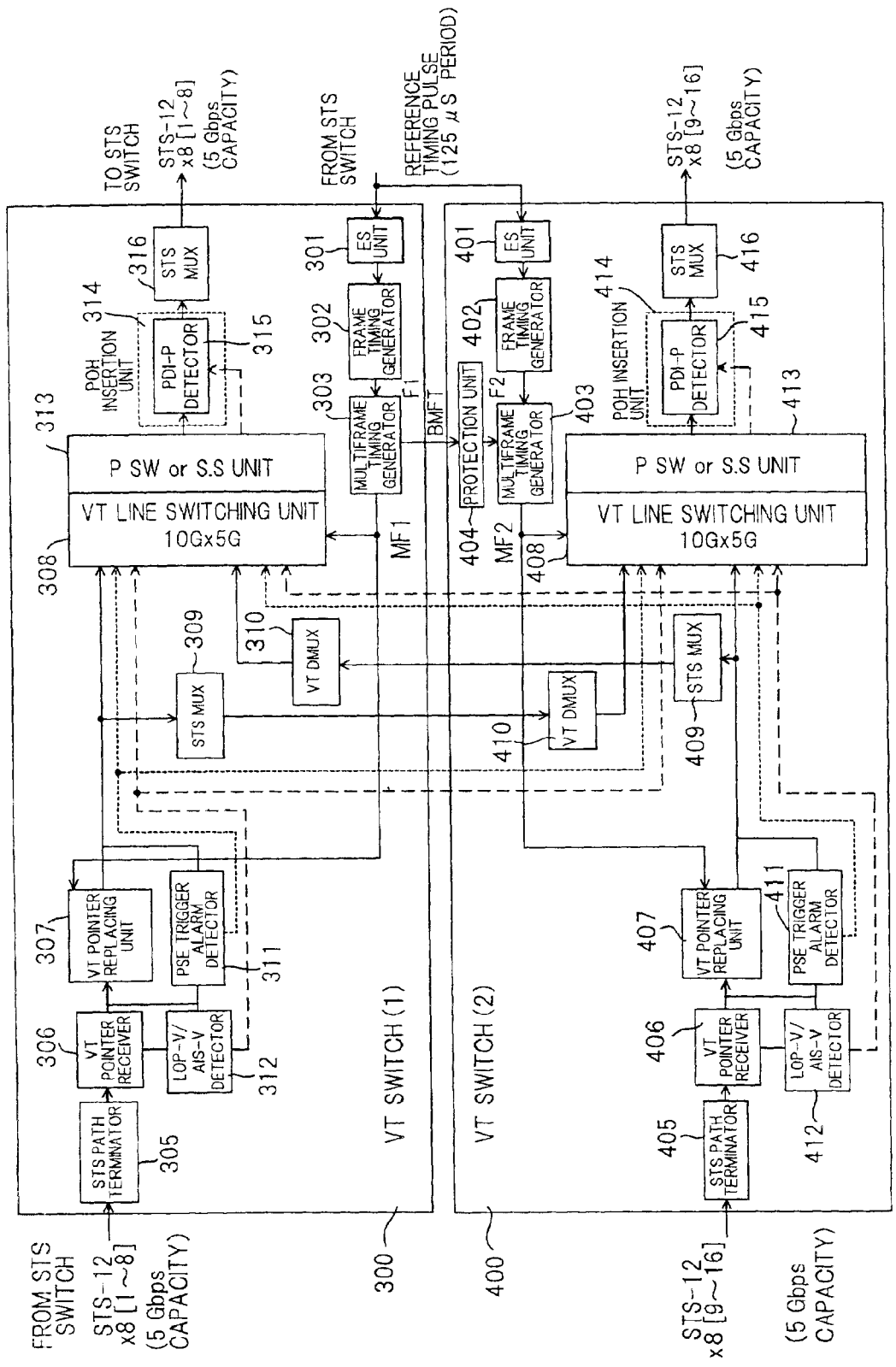
FIG. 10 is a block diagram of double VT switches according to the present invention.

FIG. 10 is a block diagram of double VT switches of the present invention equipped with an arrangement which accommodates for phase difference. The VT switches 300, 400 have substantially the same structures. In the present invention, VT multiframe timings in the two VT switches 300, 400 are made to coincide and VT pointers are replaced at each VT switch using this multiframe timing as a reference. As a result, the phase difference between the data of the two VT switches 300, 400 can be minimized.

Further, in order to bring the multiframe timing positions in the two VT switches into agreement in accordance with the present invention, one VT switch 300 serving as a master delivers a pulse, which indicates the timing of a reference multiframe, to the other VT 400 switch serving as a slave. This reference multiframe timing pulse is a timing pulse of 50% duty indicating a position one-half frame (=62.5 μs) ahead of multiframe timing pulse in the master VT switch 300. The slave VT switch 400 accepts this reference multiframe timing pulse of 50% duty, to which protection has been applied, as its reference timing. As a result, it is possible to bring multiframe timings into agreement reliably without the influence of one-shot noise.

In FIG. 10, a reference timing pulse that enters from the right side is a reference timing pulse having a period of 125 μs distributed from an STS switch.

Figure 11:
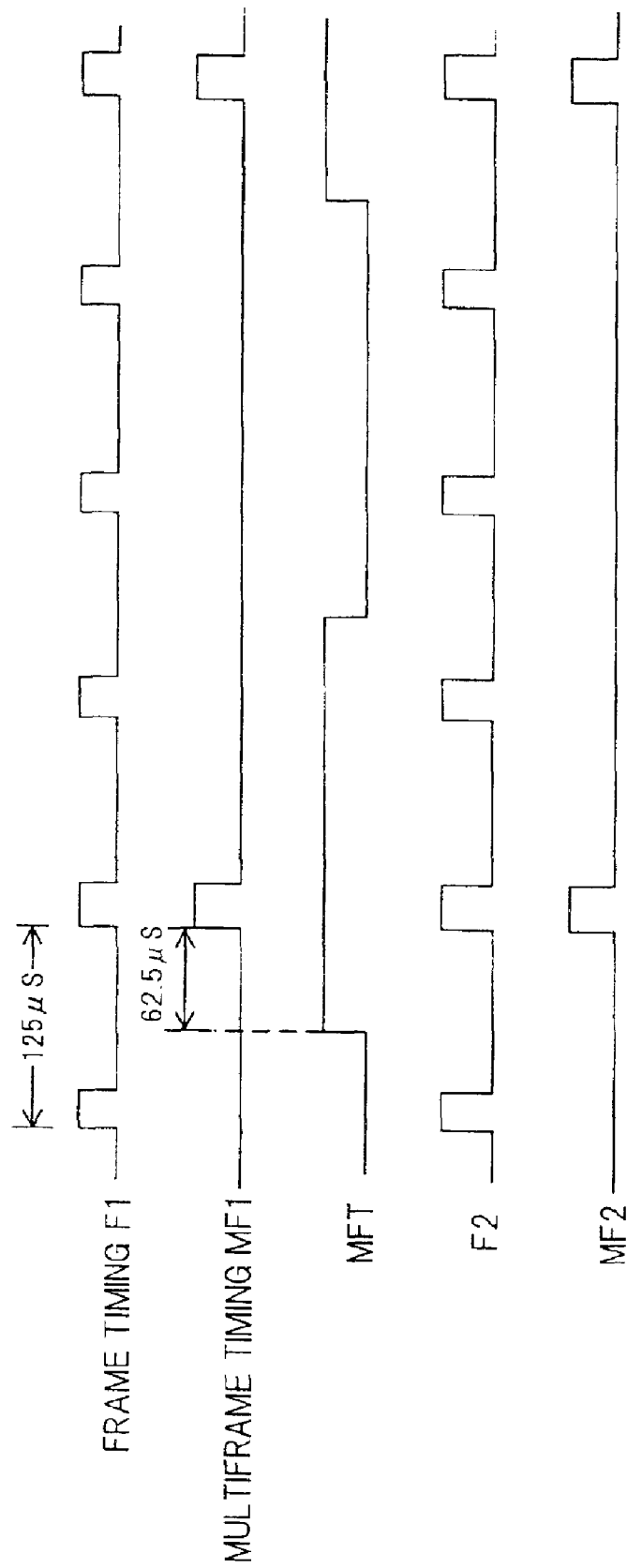
FIG. 11 is a time chart of various timing pulses.
Figure 12:
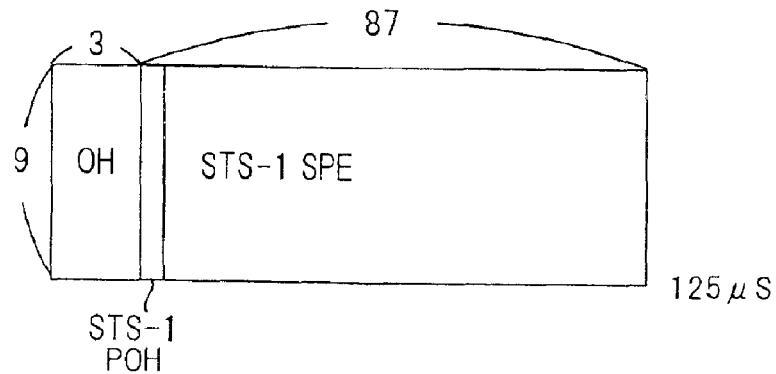
FIG. 12 shows an STS-1 frame format according to the prior art.
Figure 13:
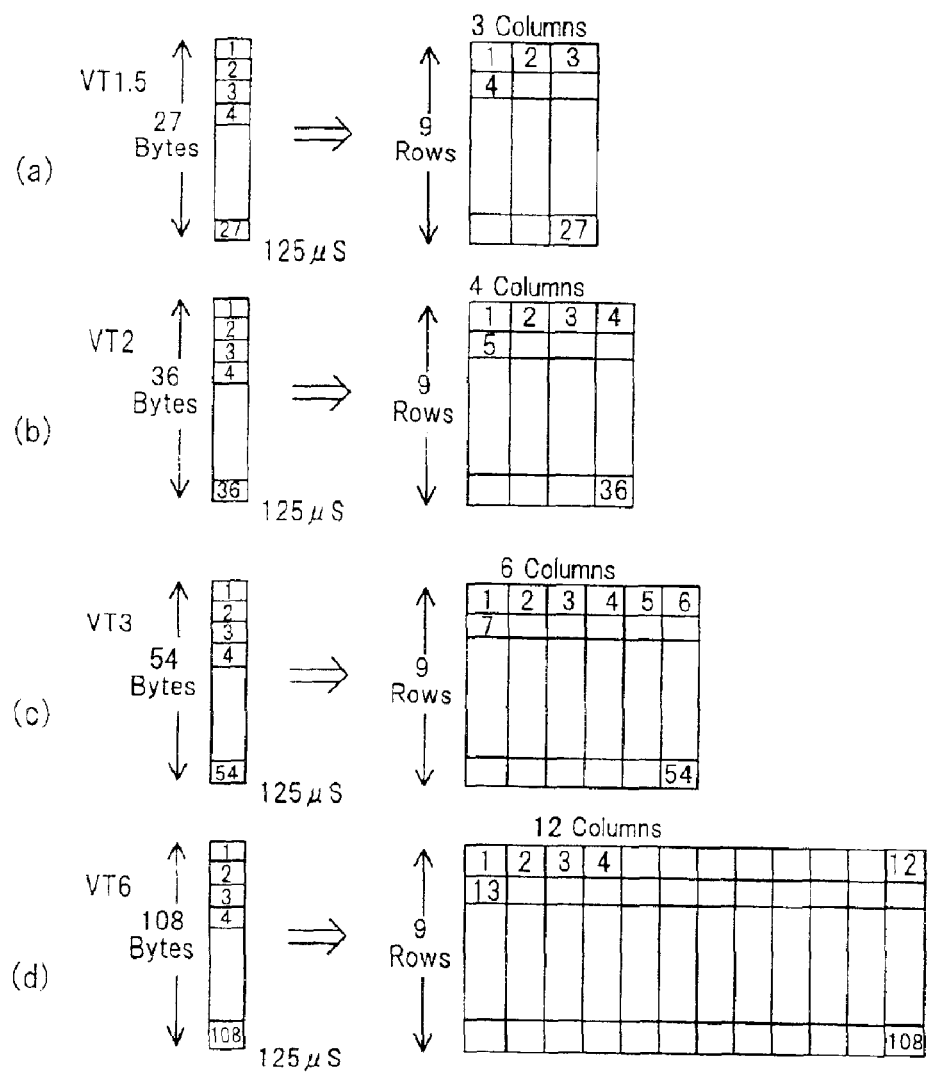
FIG. 13 shows various VT structures according to the prior art.
Figure 14:
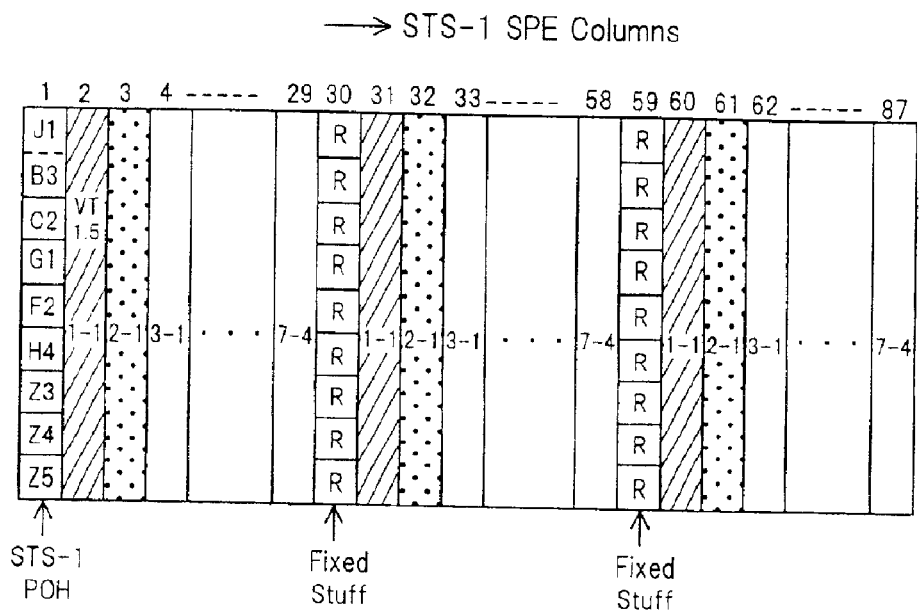
FIG. 14 shows the structure of an STS-1 SPE according to the prior art.
Figure 15:
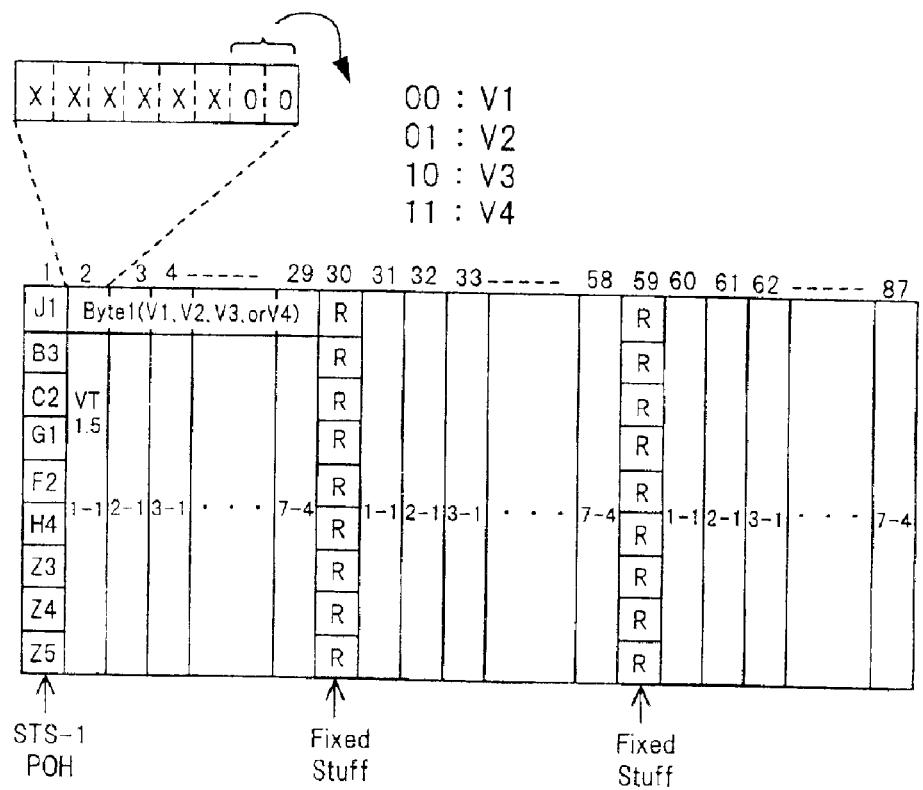
FIG. 15 shows the structure of an STS-1 SPE of a 500-μs superframe according to the prior art.
Figure 16B:
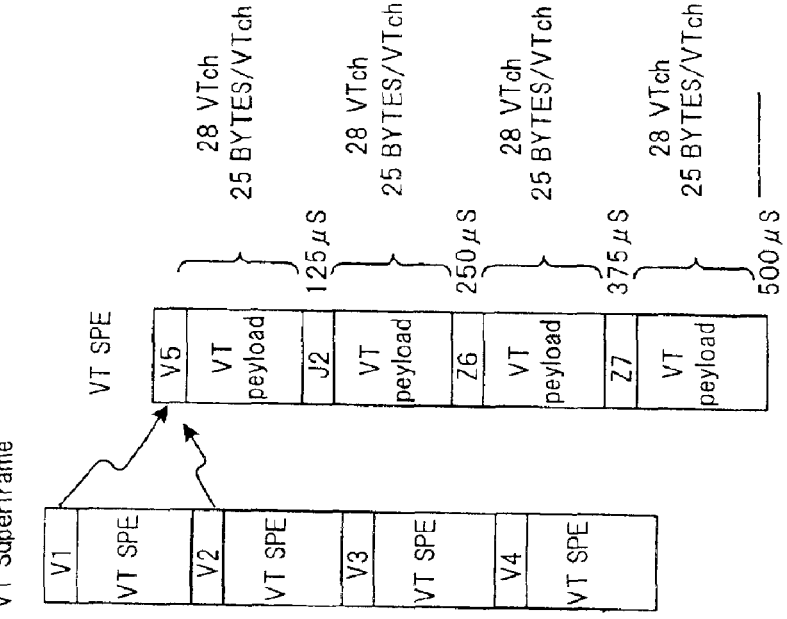
FIGS. 16A and 16B illustrate the structure of a superframe according to the prior art.
Figure 16A:
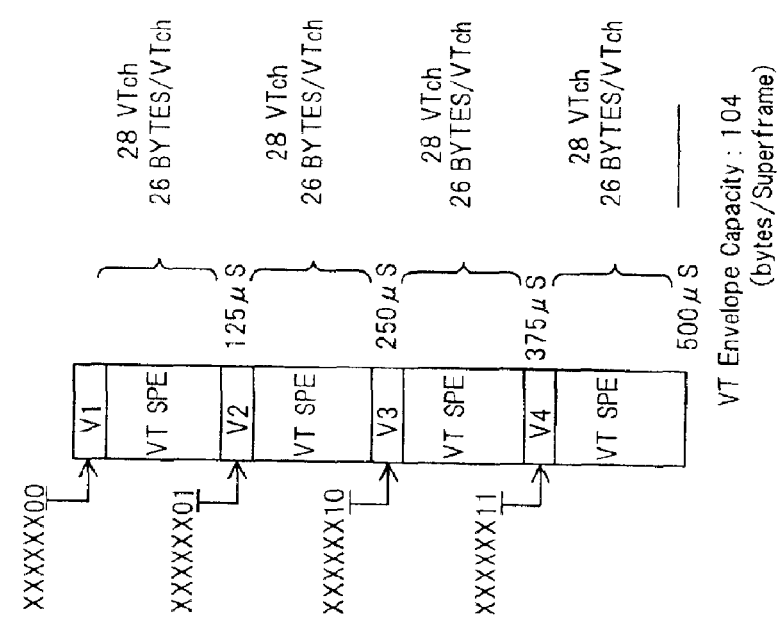
Figure 17:
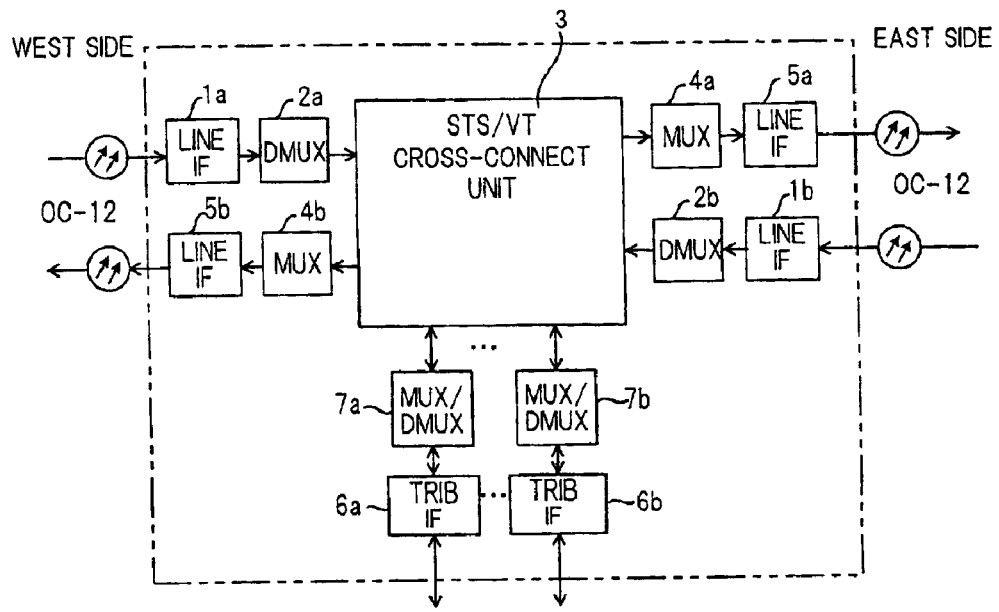
FIG. 17 is a simplified block diagram of an ADM apparatus according to the prior art.
Figure 18:
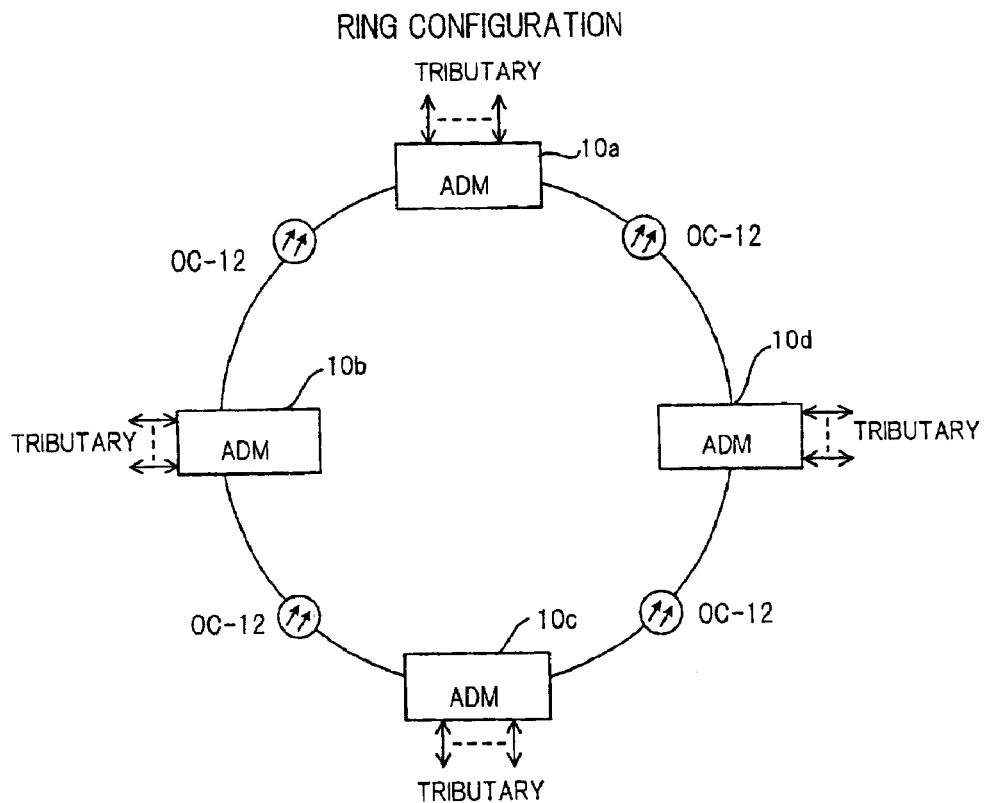
FIG. 18 is a diagram showing the structure of a ring according to the prior art.
Figure 19:
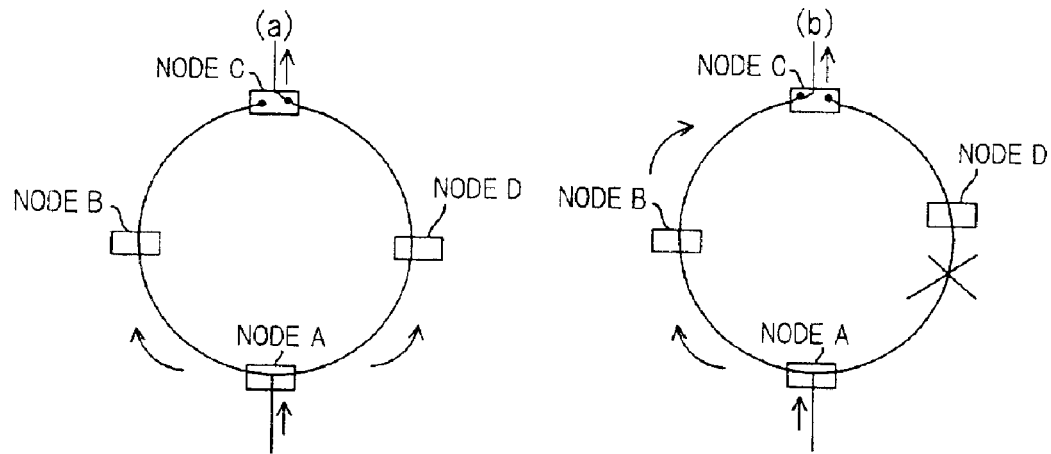
FIG. 19 is a diagram useful in describing a UPSR in a SONET according to the prior art.
Figure 20:
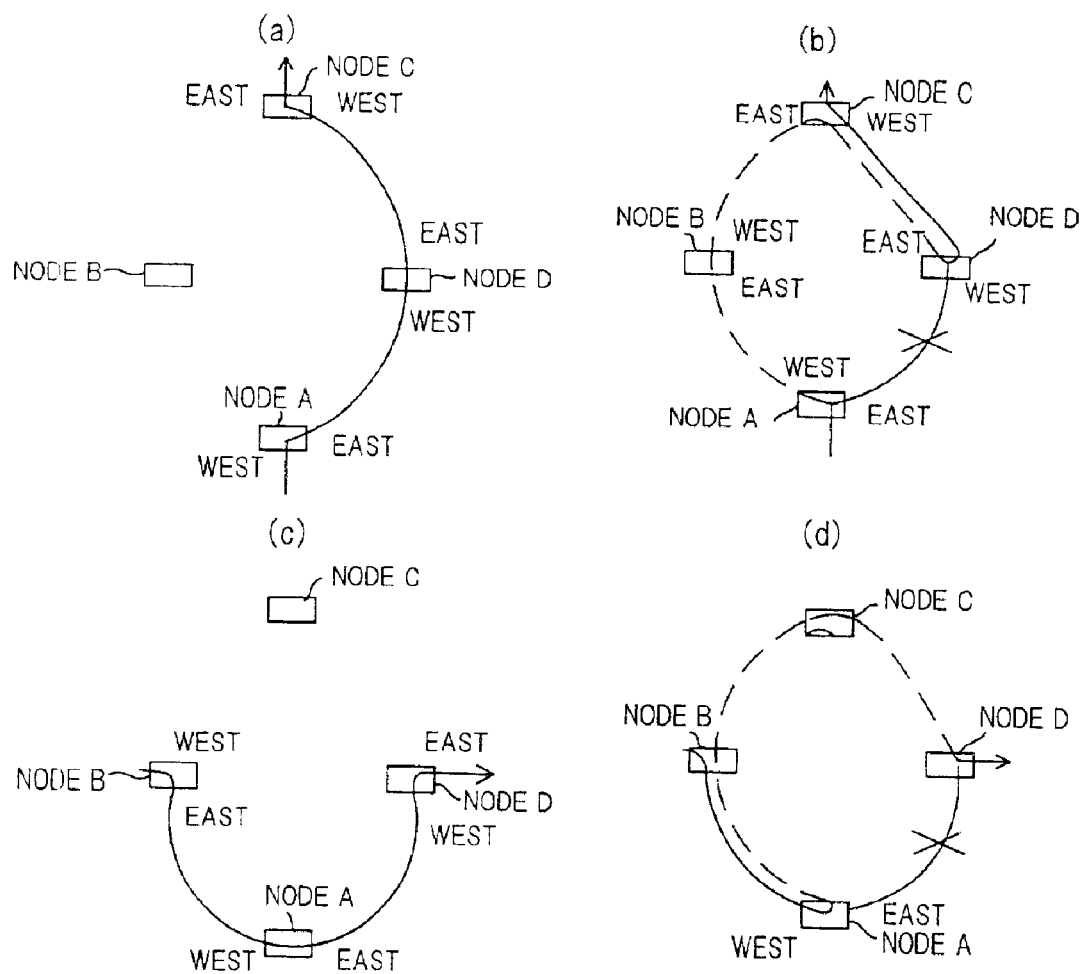
FIG. 20 is a diagram useful in describing a BLSR in a SONET according to the prior art.
Figure 21:
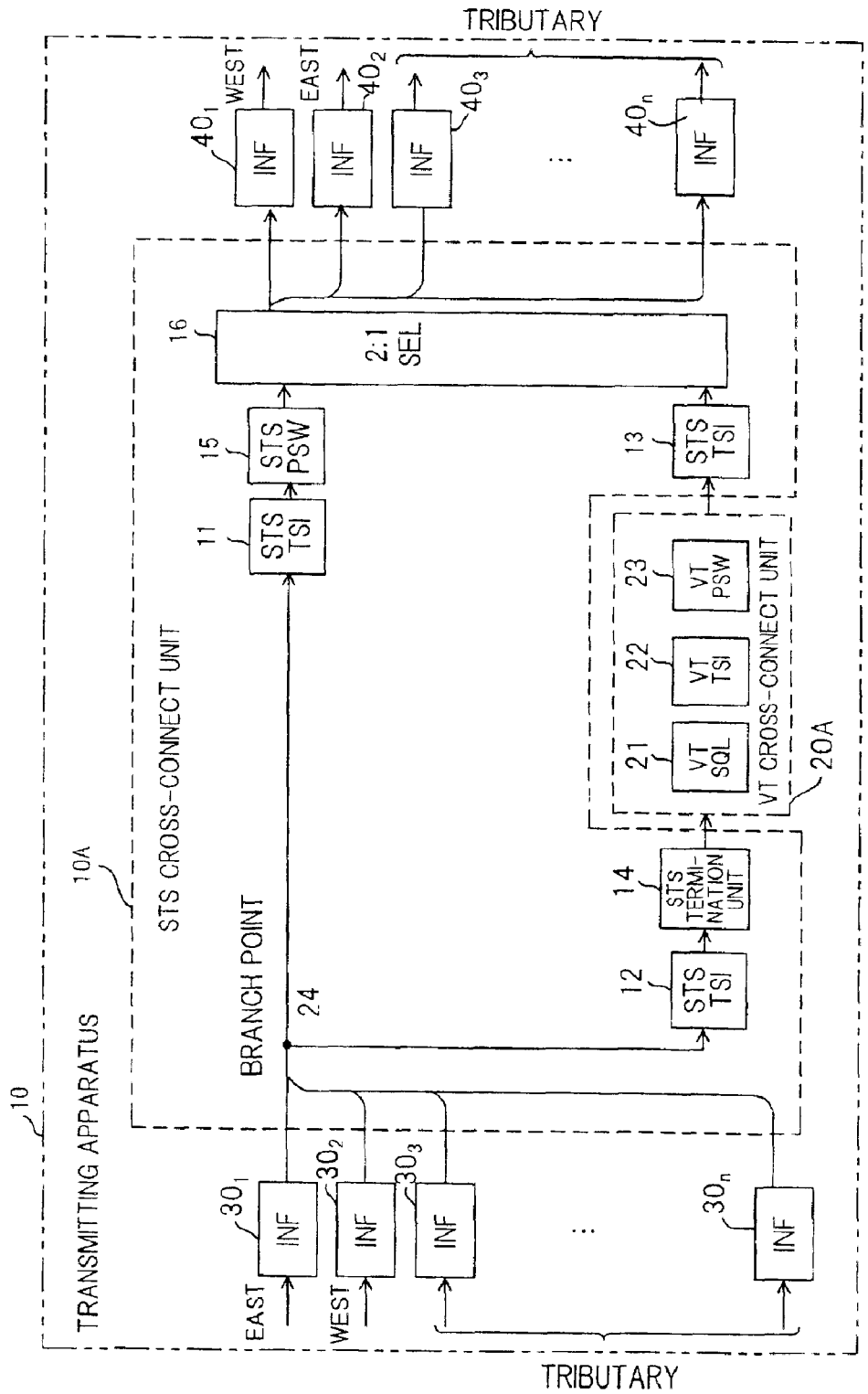
FIG. 21 is a block diagram showing the system configuration of a transmitting apparatus according to the prior art.
Figures 22A, 22B:
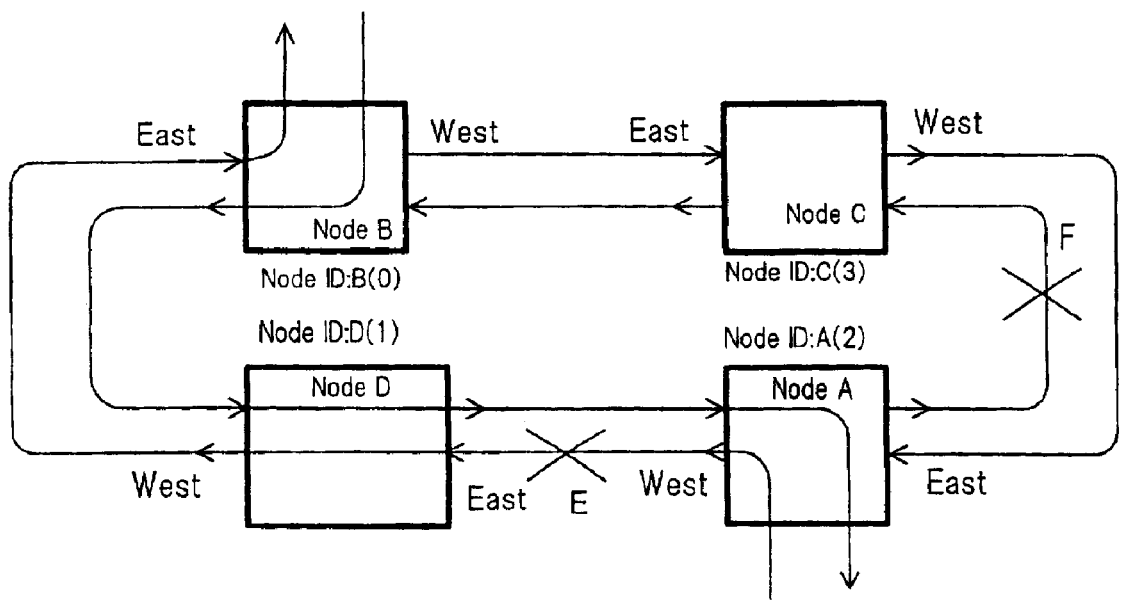
FIGS. 22A and 22B are diagrams useful in describing the concept of VT squelch according to the prior art.
Figure 23:
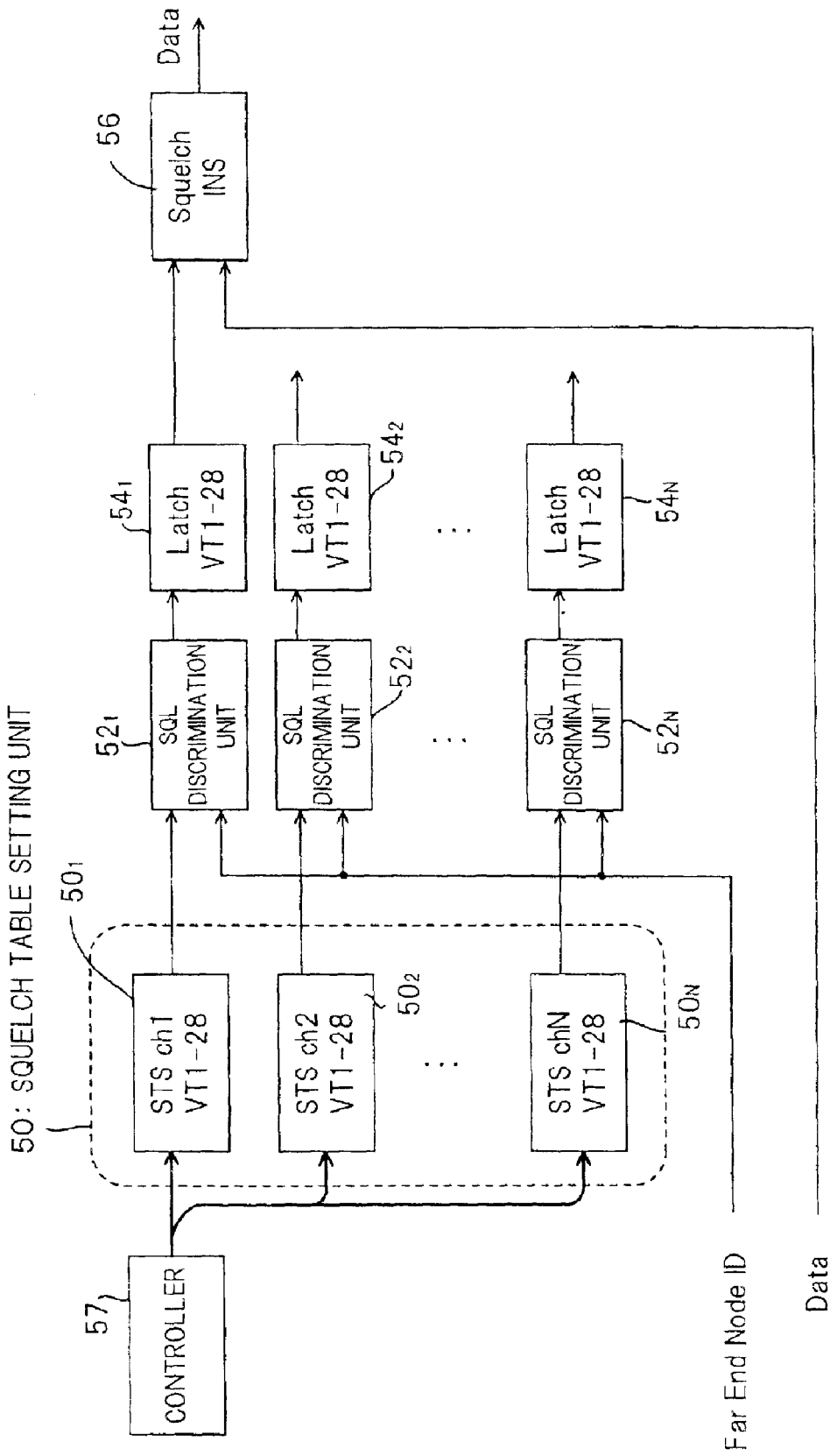
FIG. 23 is a block diagram showing a VT squelch processor according to the prior art.
Figure 24:
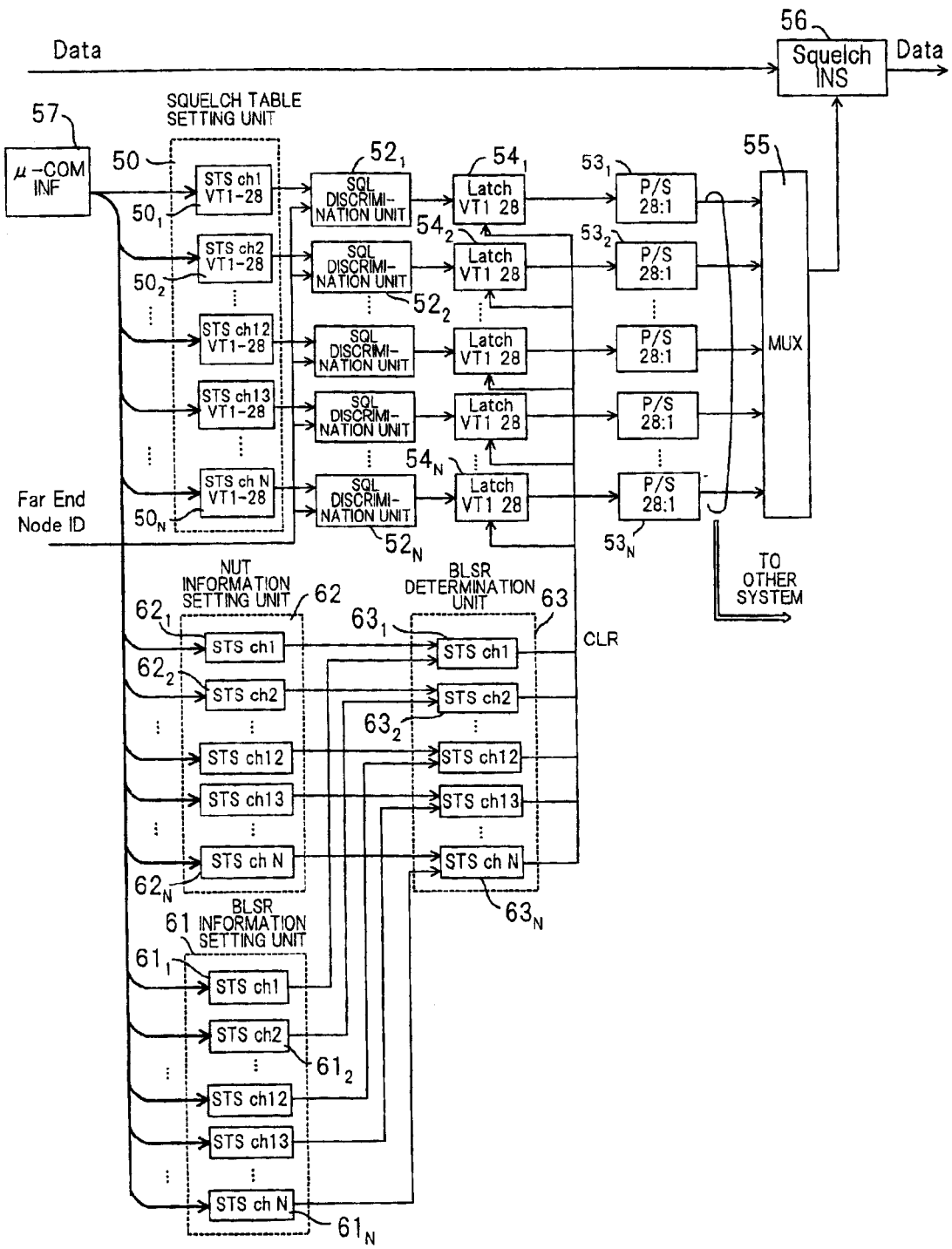
FIG. 24 is a block diagram illustrating the entirety of a squelch processor having a BLSR information setting unit and a NUT information setting unit according to the prior art.
Figure 25:
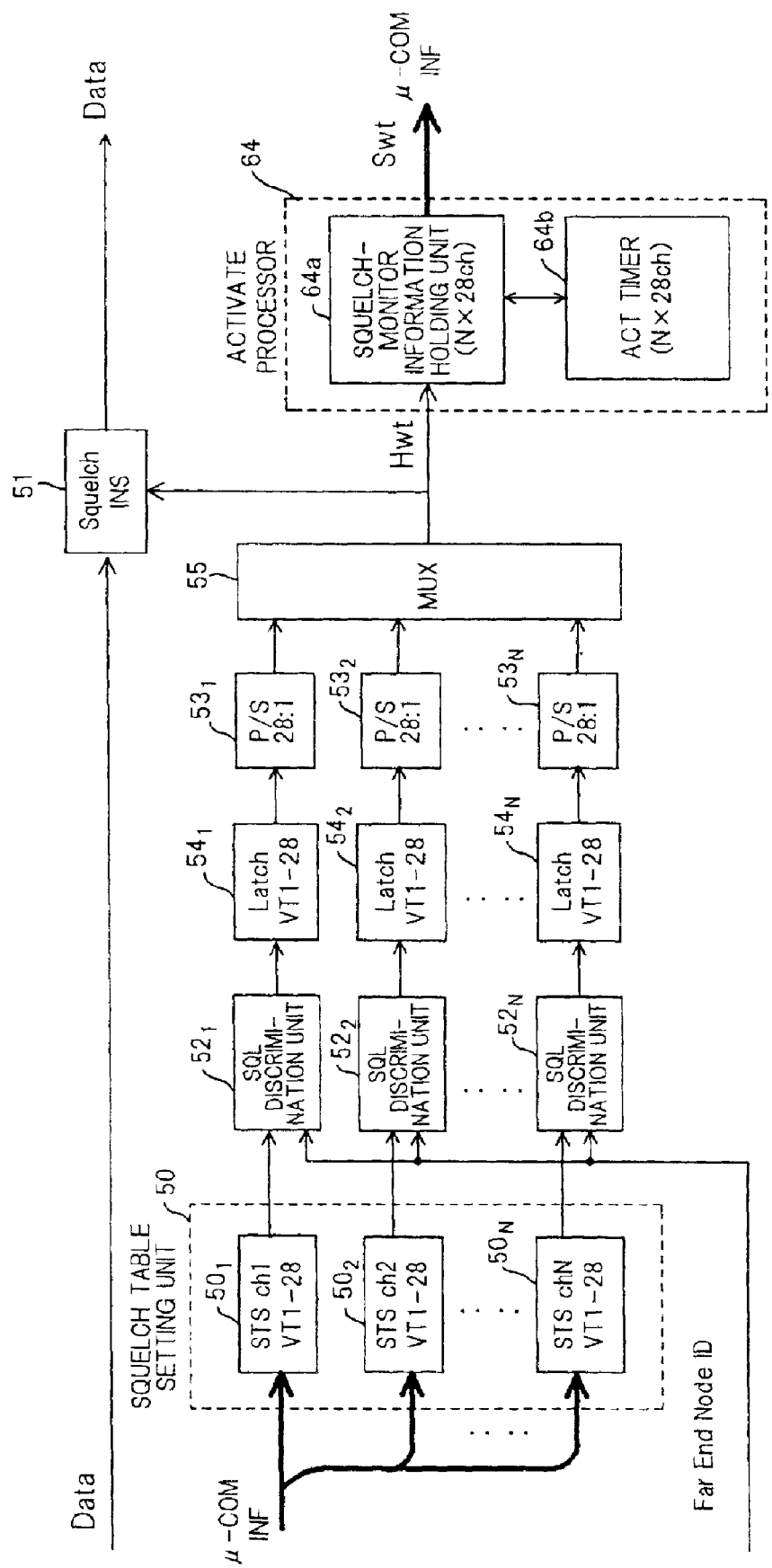
FIG. 25 is a block diagram of an arrangement in which an activate processor is connected to a squelch processor according to the prior art.
Figure 29:
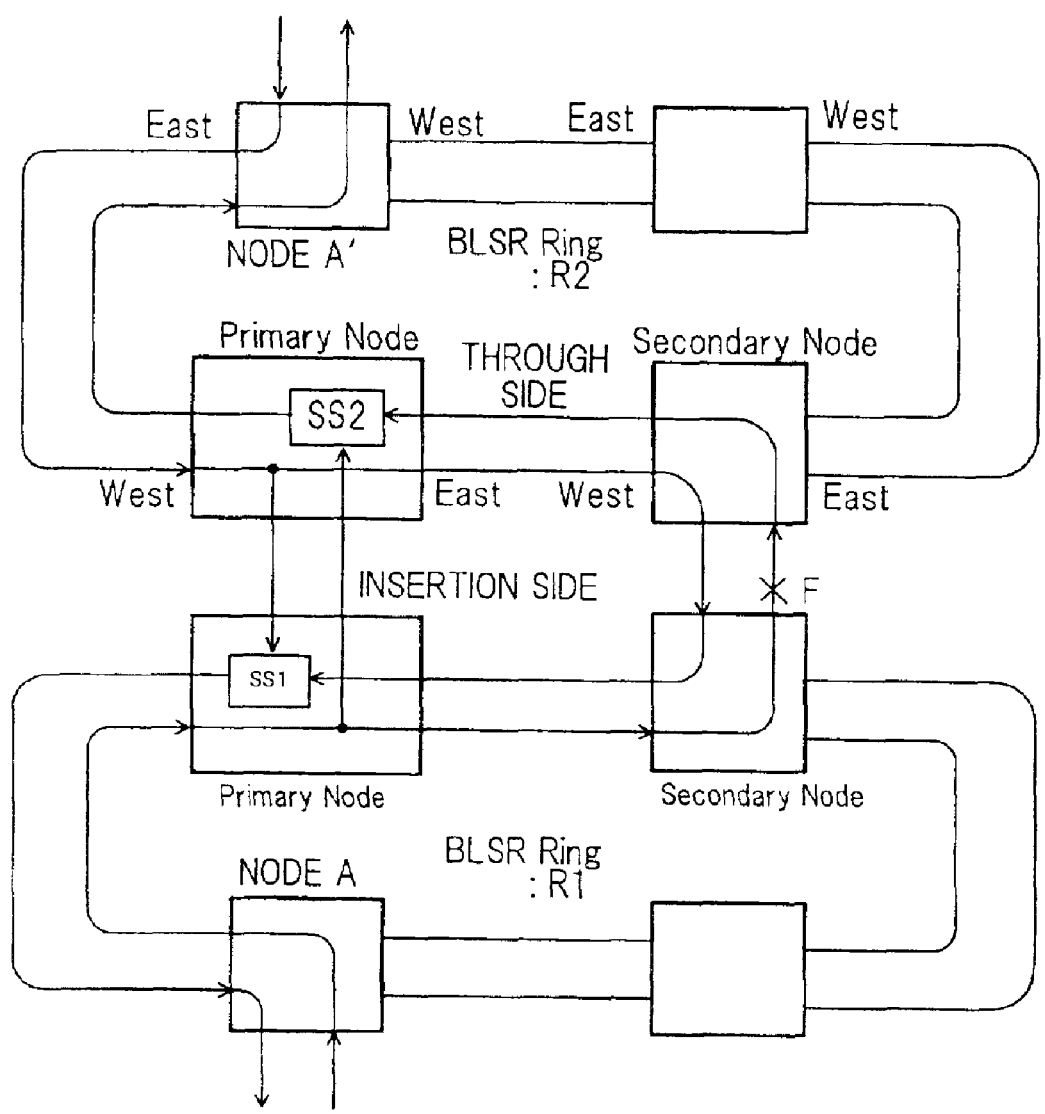
FIG. 29 is a diagram useful in describing a case where a selector of a VT-PSW is used as a service selector SS according to the prior art.
Figure 30:
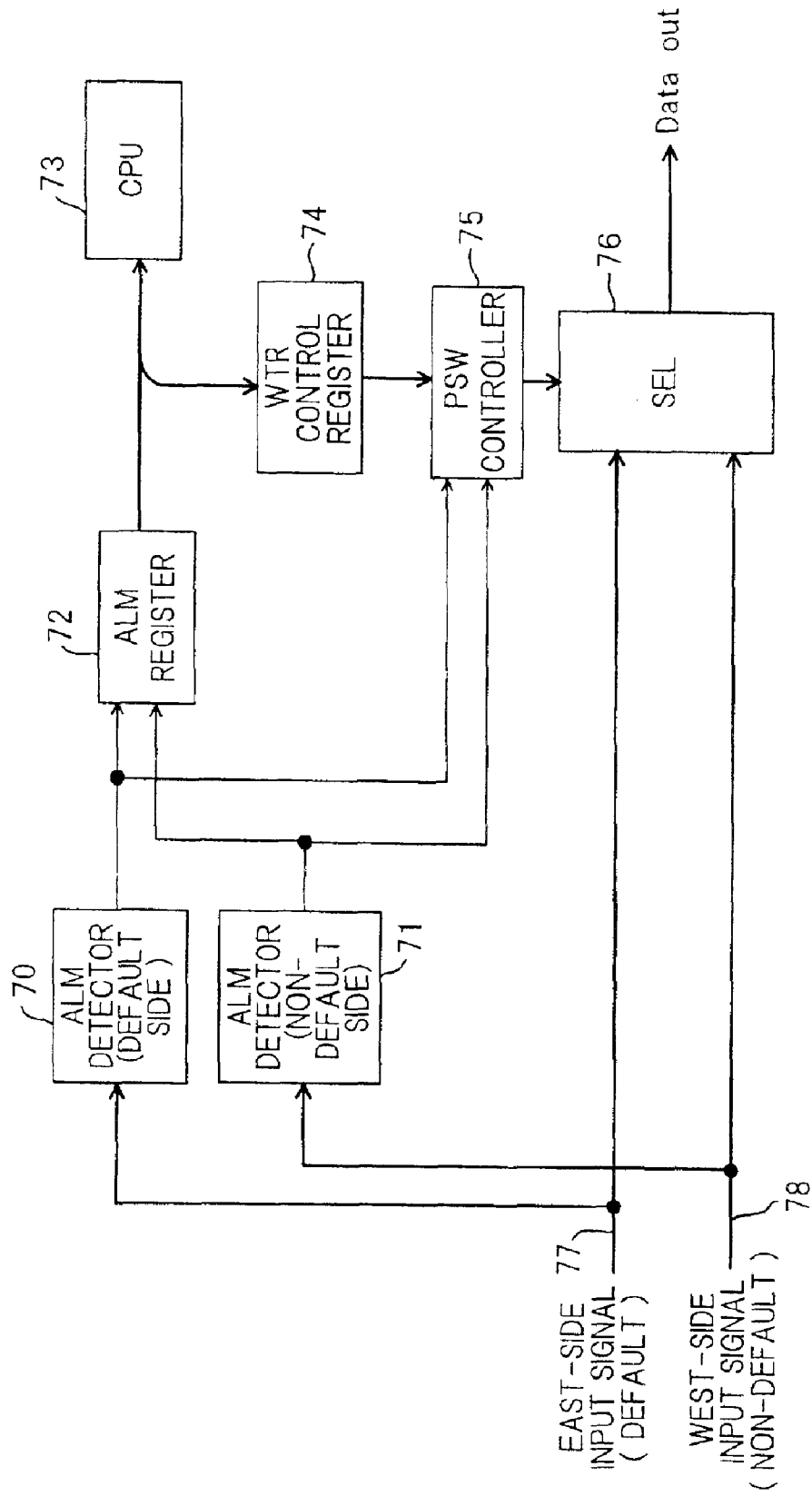
FIG. 30 is a diagram useful in describing a case where a selector of a VT-PSW is used as a path selection switch of a USPR according to the prior art.
Figure 31:
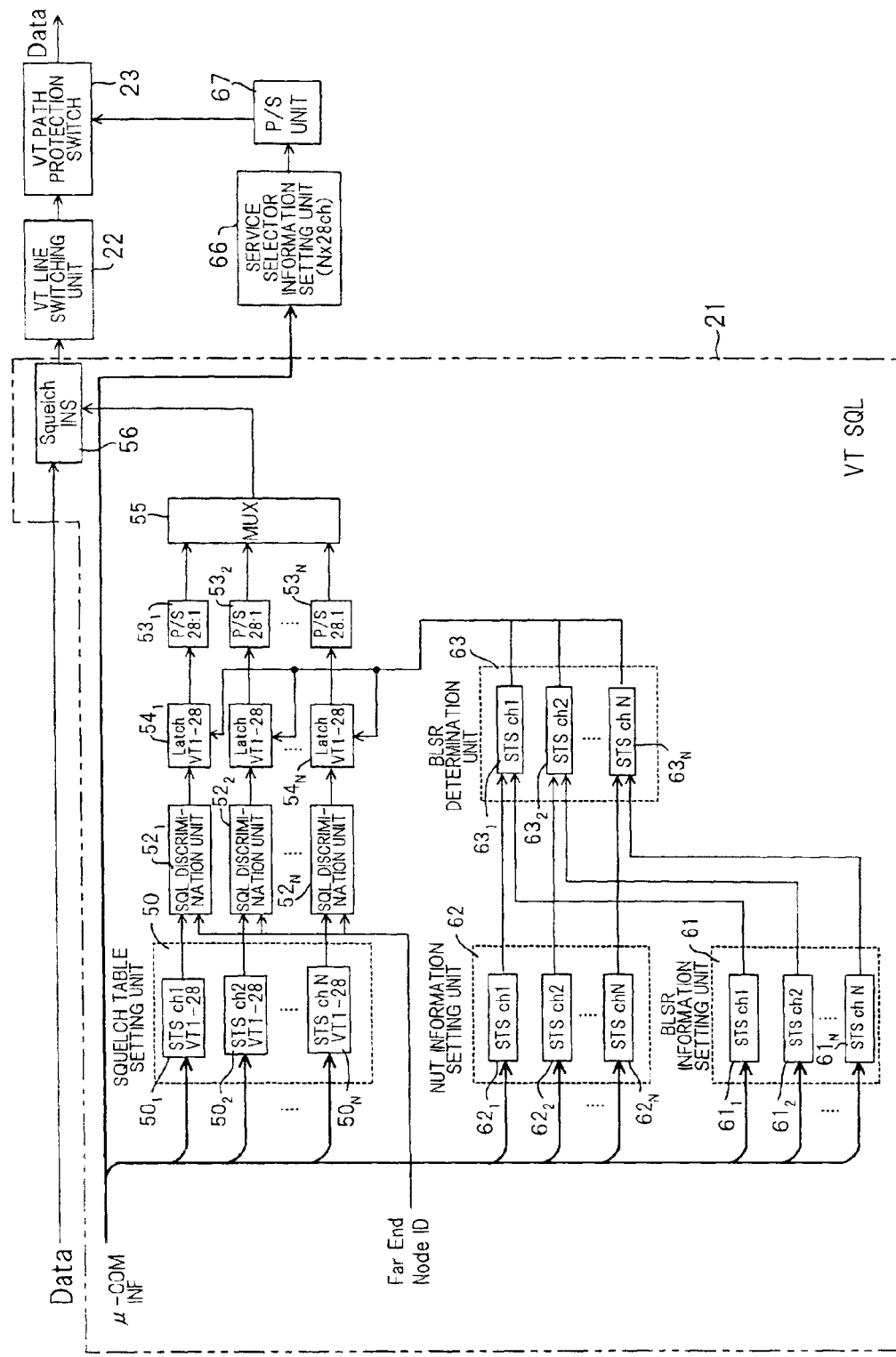
FIG. 31 is a block diagram in which a service selector information setting unit is placed on the output side of a squelch processing according to the prior art.
Figure 32:
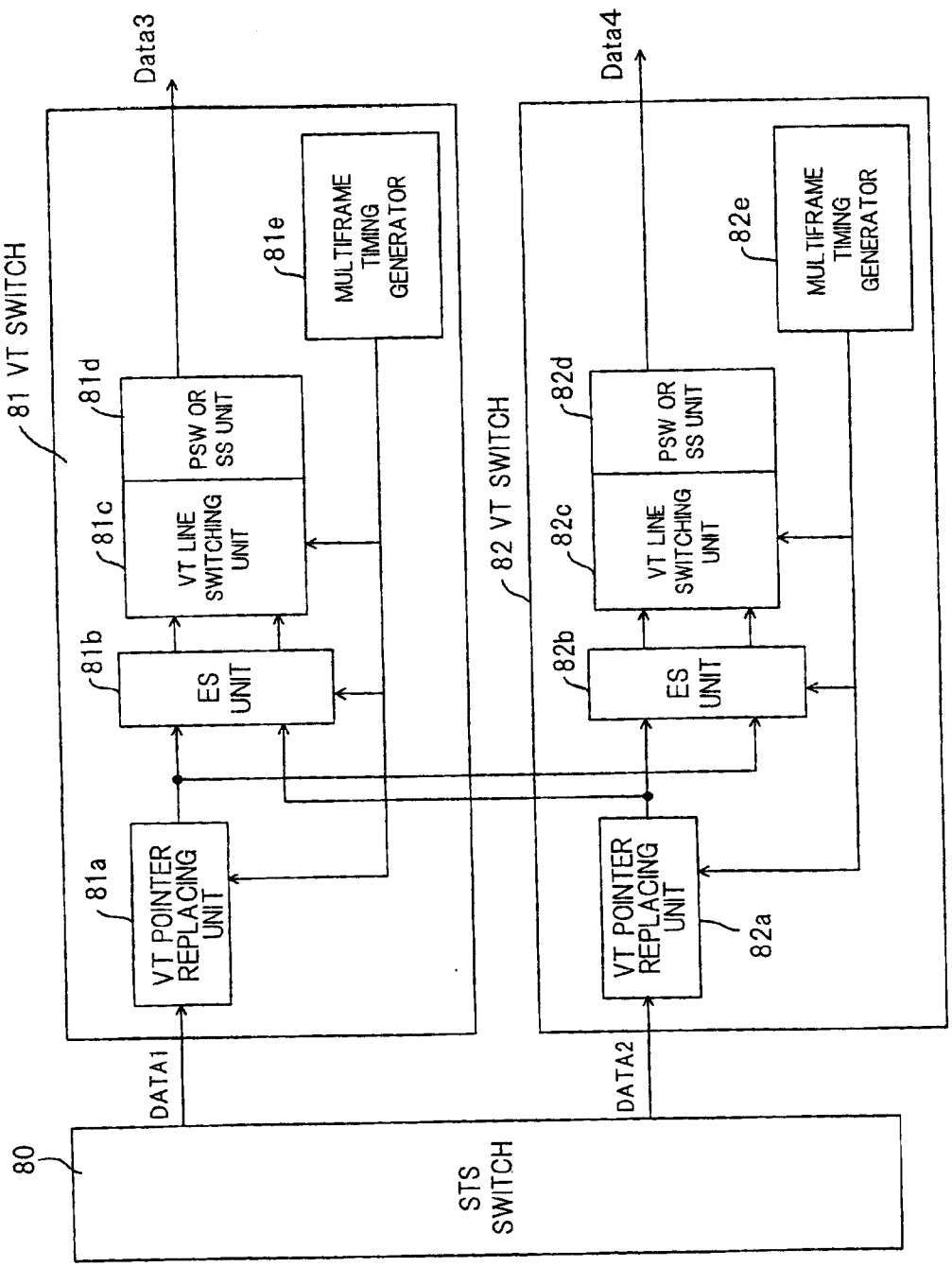
FIG. 32 is a block diagram of an arrangement in which VT signals are interchanged between VT switches according to the prior art.

ES units (elastic memories) 301, 401 change over the reference timing pulse, which has been distributed from the STS switch, to a 78-MHz master clock pulse within the VT switch. Frame timing generators 302, 402 executes three-stage protection, of a period of 125 μs, with regard to the frame timing after the pulse has been changed over to the master clock pulse, and subsequently activate frame timing counters (not shown) based upon this frame timing to generate frame timing pulses F1, F2 (see FIG. 11), which have a period of 125 μs, within the VT switches. A multiframe timing generator 303 in the master VT switch 300 generates a multiframe timing pulse MF1 (the period of which is 500 μs) by a free-running counter based upon the frame timing pulse F1 generated in the VT switch 300. The multiframe timing generator 303 thenceforth outputs, to the slave VT switch 400, a reference timing pulse BMFT (the period of which is 500 μs) of 50% duty indicating a position one-half frame (=62.5 μs) ahead of the multiframe timing pulse. The multiframe timing generator 303 outputs also a clock that is synchronized to the pulse BMFT.

The slave VT switch 400 has a protection unit 404 for sampling, at a period of 0.1 μs, the reference multiframe timing pulse BMFT (the duty and period of which are 50% and 500 μs, respectively) that has entered from the master VT switch 300, and for monitoring the continuity of the sampled values (i.e., whether three successive sampled values are at the high level). The protection unit 404 accepts the reference multiframe timing pulse BMFT only if the value is the same three times in succession.

Using as a reference the reference multiframe timing pulse BMFT that has been accepted from the master VT switch 300, the multiframe generator 403 generates, a multiframe timing MF2 at the position of the frame timing pulse F2, which is firstly generated by the frame generator 402 in this VT switch after the reference multiframe timing pulse BMFT generates. If this arrangement is adopted, the positions of the multiframe timings MF1, MF2 in the two VT switches will coincide.

Meanwhile, data that enters from the upper left of FIG. 10 is an STS signal having a maximum capacity of 10 Gbps (for 192 STS-1 channels) selected as VT-accessed STSs in the STS switch (not shown) of the preceding stage. This 10-Gbps signal has a form obtained by the 16-channel multiplexing of an STS-12 signal, for example. The 16 channels of STS-12 are split into eight channels each and eight channels are input to the VT switch 300 and eight channels to the VT switch 400.

An STS bus terminator 305 (405) within the VT switch subjects the input STS signal of maximum capacity 5 Gbps to STS bus termination processing to decompose the signal into STS-SPE signals. A VT pointer receiver 306 (406) extracts the received VT pointer values from the STS-SPE signals and decomposes them into VT signals. Using the multiframe timing as a reference, a VT pointer replacing unit 307 (407) replaces the pointer values in order to align the V5-bit positions of the received VT signals.

The VT signals following pointer replacement are delivered to a VT line switching unit 308 (408) in this VT switch and to a VT line switching unit 408 (308) in the other VT switch. In order to reduce the number of interface signals, the signal that will be output from this other VT switch 400 (300) is multiplexed into the STS-12-signal format by an STS MUX 309 (409), after which the signal is output. The other VT switch 400 (300) that receives this STS signal uses an STS DMUX 410 (310) to demultiplex the STS-12 signal into VT signals, after which the VT signals are input to the VT line switching unit 408 (308).

A PSW trigger alarm detector 311 (411) detects a VT-level alarm ALM, which is a trigger alarm of the VT path protection switch or VT service selector switch. An LOP-V/AIS-V detector 312 (412) detects LOP-V and AIS-V. The detected trigger alarm information and LOP-V or AIS-V detection information is delivered to the VT line switching unit 308 (408) in this VT switch and to the VT line switching unit 408 (308) in the other VT switch.

The VT line switching unit 308 (408) executes line switching at the VT level with regard to the VT signals, trigger alarm information and LOP-V or AIS-V detection information generated in this VT switch 300 (400), and with regard to the VT signals, trigger alarm information and LOP-V or AIS-V detection information sent from the other VT switch 400 (300). More specifically, 5376 (=192×28) VT channel signals, which are obtained by combining the capacity of 5 Gbps processed by this VT switch 300 (400) and the capacity of 5 Gbps processed by the other VT switch 400 (300), are cross connected at the VT level and 2688 VT channel signals are output.

After interchange of VT lines, a PSW or SS unit 313 (413) executes a VT path protection switch operation or VT service selector switch operation with respect to the VT signals and LOP-V or AIS detection information in accordance with the trigger alarm information.

A POH insertion unit 314 (414) inserts POH information into the STS path overhead byte when VT signals are mapped into an STS signal. The POH insertion unit 314 (414) has a PDI-P transmitter 315 (415) having a function for inserting a PDI-P code into the C2 byte. The PDI-P transmitter 315 (415) counts the number of failed channels of VT signals mapped into the STS signal and inserts the PDI-P code into the C2 byte of the STS signal. The calculation of the number of failed channels is performed by counting up the LOP-V or AIS-V information.

An STS MUX 316 (416) inserts section-overhead/line-overhead information into the section/line overhead byte of the STS signal. The STS signal is sent from the STG MUS in the STS-12 format.

Thus, the VT multiframe timings in two VT switches are made to coincide and VT pointer replacement is performed by each VT switch using the multiframe timing as a reference. This minimizes the phase difference between the data of the two VT switches. As a result, an elastic memory necessary in the prior art for the purpose of storing VT signals can be eliminated. Further, by strictly discriminating reference multiframe timing pulses that enter from the master VT switch, multiframe timings can be made to coincide reliably, without the influence of noise, in the master/slave VT switches.

In accordance with the present invention, NUT information registers need be provided only for STS working channels in a first direction used by a BLSR. As a result, the number of registers for setting the NUT information can be reduced, the amount of circuitry can be reduced and the processing load on the CPU can be alleviated.

Further, in accordance with the present invention, BLSR determination can be carried out using NUT information linked to channels (channels that are the object of BLSR rescue) accommodated by a BLSR and BLSR-type setting information indicative of the BLSR transmission rate. This makes it possible to reduce the number of registers for setting the BLSR. In addition, the number of channels for BLSR determination processing can be reduced and it is possible to reduce BLSR determination circuitry and mask processing circuitry for VT squelch.

Further, in accordance with the present invention, the results of VT squelch discrimination of channels that are the object of BLSR rescue are subjected to activate processing before cross connect is performed, VT squelch discrimination results following activate processing are interchanged utilizing the STS cross-connect information of the main signals and the results are reported to the CPU. As a result, it is possible to reduce the number of active processing channels.

Further, in accordance with the present invention, the results of BLSR determination indicative of BLSR rescue channels are interchanged utilizing cross-connect information (STS and VT) of main-signal data, and these results are delivered to a VT path protection switching unit. As a result, SS information setting registers (N×VT channel's worth) can be reduced and it is possible to reduce the amount of circuitry and to lighten the CPU processing load.

Further, in accordance with the present invention, the VT multiframe timings in two VT switches are made to coincide and VT pointer replacement is performed in each of the VT switches using the multiframe timing as a reference. As a result, the phase difference between the data of the two VT switches can be minimized (an accommodation is made for the phase difference) and the elastic memory required in the prior art can be eliminated. Further, in accordance with the present invention, it is possible to make the multiframe timings of two VT switches coincide reliably without the influence of one-shot noise.

As many apparently widely different embodiments of the present invention can be made without departing from the spirit and scope thereof, it is to be understood that the invention is not limited to the specific embodiments thereof except as defined in the appended claims.

What is claimed is:

1. A transmitting apparatus which constructs a ring network capable of transmitting in first and second directions via first and second transmission lines respectively, said transmitting apparatus cross connecting and transmitting main signals on respective channels, which enter via one of the first and second transmission lines to which working and protection channels have been assigned, and rescuing a main signal when a transmission line fails by looping back the main signal in the opposite direction using the protection channel of another transmission line, said apparatus comprising:

a squelch controller for determining whether failure for which rescue is impossible has occurred in each channel of a second group, wherein channels that are the object of rescue by loop-back are classified to a first group of channels which are set so as not to be rescued by loop-back and a second group of channels other than the first group of channels and a channel of the first group is referred to as an non-rescue channel;

a NUT table setting register for storing non-rescue information which indicates whether a channel that is the object of rescue by loop-back is a non-rescue channel; and a squelch insertion unit which, on the basis of main-signal cross-connect information, interchanges a result of discrimination of each channel of the second group and inserts the interchanged result of discrimination in the main signal of the corresponding channel after cross connect.

2. The apparatus according to claim 1, further comprising:
BLSR-type setting unit for storing ring type which specifies transmission rate of ring network to which the transmitting apparatus is connected; and
BLSR determination circuit for deciding, on the basis of the ring-type information and non-rescue information, whether each channel that is the object of rescue is the channel of the second group;
wherein said NUT table setting register has a storage area for storing, on a per-ring-type basis, non-rescue information which specifies whether a channel that is the object of rescue is a non-rescue channel; and
said BLSR determination circuit makes the decision based upon the non-rescue information of the ring type stored in the BLSR-type setting unit.

3. The apparatus according to claim 2, wherein said NUT table setting register stores the non-rescue information only for working channels in a prescribed direction among the channels that are the object of rescue;
said BLSR determination circuit decides channels of the second group from among the working channels of said direction;
said squelch controller determines whether an unrescuable failure has occurred in the channel of the second group; and
on the basis of main-signal cross-connect information, said squelch insertion unit interchanges the result of discrimination of the channels of the second group and inserts the interchanged result of discrimination in the main signal of the corresponding channel after cross connect, this insertion being performed in the working channels and protection channels of the first and second directions.

4. The apparatus according to claim 1, wherein the channels are STS channels in a synchronous optical network;
said squelch controller determines whether failure for which rescue by loop-back is impossible has occurred in each virtual tributary channel (VT channel) accommodated by an STS channel of the second group; and
on the basis of main-signal STS cross-connect information, said squelch insertion unit interchanges a result of discrimination of said each VT channel on a per-STS-channel basis and inserts the interchanged result of discrimination in a corresponding VT signal after STS cross connect.

5. The apparatus according to claim 1, further comprising:
activate processing means for receiving the discrimination result before it is interchanged based upon the cross-connect information, monitoring whether an unrescuable failure has continued in excess of a predetermined period of time for every channel, and monitoring whether a recovery from failure has been accomplished; and
interchanging means for interchanging and outputting result of monitoring on the basis of main-signal cross-connect information.

6. The apparatus according to claim 5, wherein the channels are STS channels in a synchronous optical network;
said squelch controller determines whether failure for which rescue by loop-back is impossible has occurred in each virtual tributary channel (VT channel) accommodated by an STS channel of the second group;
said activate processing means monitors whether an unrescuable failure has continued in excess of a predetermined period of time for every VT channel and monitors whether a recovery from failure has been accomplished for every TV channel; and
said interchanging means interchanges and outputs result of monitoring of every VT channel on a per-STS-channel basis on the basis of main-signal cross-connect information.

7. The apparatus according to claim 4, further comprising:
a VT path protection switch having, for every VT channel, a service selector switch function which, when a failure has occurred in a first transmission path of first and second transmission paths connecting two ring networks, performs rescue by selecting a signal that enters from the second transmission path; and
a service selector information generator for generating service selector information which specifies that the VT path protection switch is to operate as service selector switch;
wherein on the basis of main-signal cross-connect information, said service selector information generator interchanges information indicating whether a channel that is the object of rescue is the channel of the second group, generates service selector information for every VT channel by this interchange, and delivers the service selector information to said VT path protection switch.

8. The apparatus according to claim 7, wherein on the basis of main-signal STS cross-connect information,
said service selector information generator interchanges information indicating whether a channel that is the object of rescue in STS working channel of a prescribed direction is the channel of the second group, and interchanges this interchanged information concerning the channel of the second group on the basis of main-signal VT cross-connect information, thereby generating service selector information for every VT channel.

9. A transmitting apparatus having an STS switch for cross connecting an STS signal which accommodates a plurality of virtual tributary signals (VT signals), and two VT switches to which an STS signal, which has been cross connected by the STS switch, is input upon being split into respective halves, wherein said VT switches replace VT pointers contained in the STS signal, VT-channel signals following the replacement of the VT pointers are passed between said VT switches and the VT signals are then cross connected, said apparatus comprising:
timing adjustment unit for adjusting multiframe timing;
a VT pointer replacement unit for replacing VT pointers using as a reference the multiframe timing that has been adjusted;
means for passing VT-channel signals between said VT switches after replacement of the VT pointers; and
a VT line switching unit for cross connecting the VT channel signals.

10. The apparatus according to claim 9, wherein
said timing adjustment unit, which is provided in one of said VT switches (a master switch), has (1) a multiframe timing generator for generating a multiframe timing pulse from a frame timing pulse, and (2) a timing pulse generator for generating a reference multiframe timing pulse of a prescribed width indicating a position one-half frame ahead of the multiframe timing; and said timing adjustment unit, which is provided in the other of said VT switches (a slave switch), has (1) a judgment circuit for sampling reference multiframe timing pulses at high speed and, if a sampled value of a pulse has the same level a plurality of times in succession, judging that the pulse is true reference multiframe timing pulse, and (2) a multiframe timing generator for adopting, as a multiframe timing pulse, a frame timing pulse of the slave switch generated the first timing detection of said reference multiframe timing pulse.

* * * * *